United States Patent [19]
Paul

[11] Patent Number: 5,616,889
[45] Date of Patent: Apr. 1, 1997

[54] APPARATUS FOR WEIGHING A LOAD WITH A PAIR OF SUMMING BARS AND SUSPENSION STRAPS

[76] Inventor: John Paul, P.O. Box 729, Duncan, Okla. 73533

[21] Appl. No.: 185,427

[22] Filed: Jan. 21, 1994

[51] Int. Cl.$^6$ .................................................. G01G 21/08
[52] U.S. Cl. .................. 177/256; 177/263; 177/DIG. 9; 177/136
[58] Field of Search ................................. 177/146, 141, 177/136, 256, 257, 258, 259, 262, 263, 244, DIG. 9

[56] References Cited

U.S. PATENT DOCUMENTS

| | | | |
|---|---|---|---|
| Re. 32,002 | 10/1985 | Shoberg et al. | 177/146 |
| Re. 32,003 | 10/1985 | Shoberg | 177/146 |
| 197,489 | 11/1877 | Onslow | 177/146 |
| 1,790,509 | 1/1931 | Moyer | 177/146 |
| 2,736,549 | 2/1956 | Paul | 177/146 |
| 4,002,215 | 1/1977 | Harvill | 177/146 |
| 4,023,634 | 5/1977 | Provi et al. | 177/146 |
| 4,050,532 | 9/1977 | Provi et al. | 177/146 |
| 4,137,977 | 2/1979 | Alger | 177/146 |
| 4,561,511 | 12/1985 | Stuart | 177/146 |
| 4,836,304 | 6/1989 | Paul | 177/146 |
| 5,205,370 | 4/1993 | Paul | 177/146 |
| 5,230,395 | 7/1993 | Paul et al. | 177/146 |
| 5,369,222 | 11/1994 | Strelioff | 177/136 |
| 5,393,936 | 2/1995 | Tyhy et al. | 177/145 |

OTHER PUBLICATIONS

Broch. "Paul Livestock Scale Sales", Assembly Instr. No Date.
Broch "Kevlar®, The Uncommon Material For Uncommon Solutions;" E.I.duPont de Nemorus & Co. (Inc.) H–05500–1.
"Kevlar®, When Your Elastomeric Application Calls For Reinforcement, Call On Easy To Disperse Kevlar® M/B ".
"Kevlar® in Conveyor Belts", E.I. duPont de Nemours & Co. (Inc.) #–76164.
"Presenting Kevlar® Aramid Fiber", H–24224, May 19, 1990 .

Primary Examiner—Michael L. Gellner
Assistant Examiner—Randy W. Gibson

[57] ABSTRACT

A summing bar suspension scale having a platform for supporting objects to be weighed, a frame, weighing bars, a weighing arm assembly, and a pair of summing bar assemblies. One of the summing bar assemblies is connected to one of the weighing bars and to the weighing arm assembly and the other summing bar assembly is connected to the other weighing bar. Strap assemblies are connected to a platform support assembly, the weighing bars and the frame and summing bar strap assemblies are connected to the summing bar assemblies so that the summing bar assemblies are rotated in response to rotation of the weighing bars by an object being disposed on the platform.

81 Claims, 7 Drawing Sheets

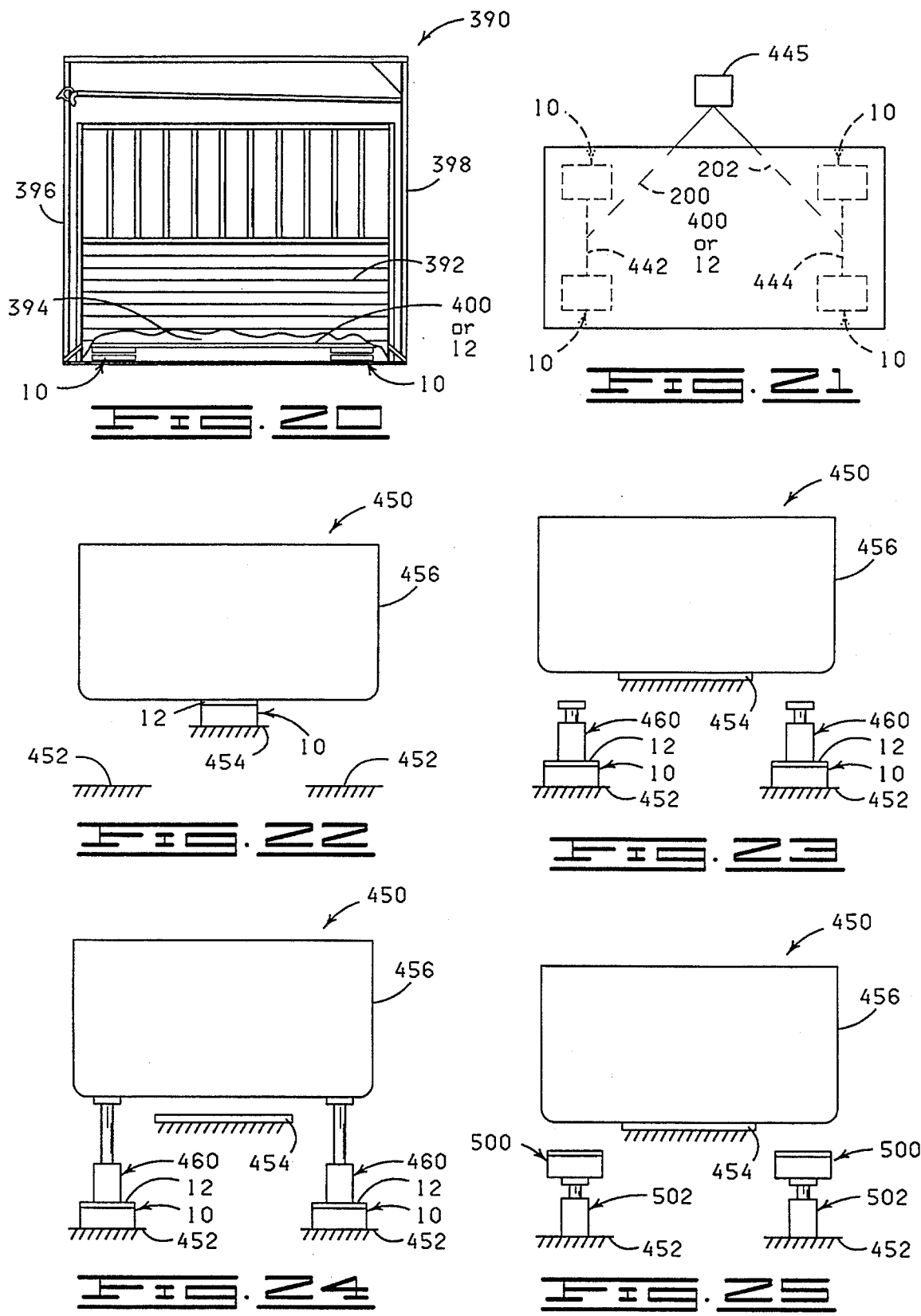

5,616,889

APPARATUS FOR WEIGHING A LOAD WITH A PAIR OF SUMMING BARS AND SUSPENSION STRAPS

FIELD OF THE INVENTION

The present invention relates to a summing bar suspension scale wherein strap assemblies interconnect a platform support assembly, weight bars and a frame, and summing bar assemblies connected to the weight bars are interconnected by strap assemblies so that the weight bars and summing bar assemblies are rotated in response to a weight being disposed on a weighing platform supported by the platform support assembly.

BRIEF DESCRIPTION OF THE DRAWINGS

FIG. 20 is a diagrammatic, schematic view of an animal holding chute incorporating the summing bar suspension scale of the present invention for weighing of animals restrained in the holding chute.

FIG. 21 is a schematic plan view of a floor of the animal holding chute of FIG. 20 having four summing bar suspension scales of the present invention having a common weighing platforms which functions as the floor of the chute.

FIG. 22 is a diagrammatic, schematic view of a portion of a refuse collection vehicle having a container supported on the summing bar suspension scales of the present invention.

FIG. 23 is a diagrammatic, schematic view of a portion of a refuse collection vehicle having a container supported therein wherein the summing bar suspension scale of the present invention is modified to incorporate a lifting assembly capable of selectively engaging and lifting the container, the lifting assembly being illustrated in a retracted position.

FIG. 24 is a diagrammatic, schematic view of a portion of the refuse collection vehicle having a container supported therein and incorporating summing bar suspension scales of the present invention wherein the lifting assembly is in an extended position so that the weight of the container is imposed on the weighing platform of the summing bar suspension scales.

FIG. 25 is a diagrammatic, schematic view of a portion of a refuse collection vehicle having a container supported therein wherein a scale assembly is supported on a lifting assembly and wherein the lifting assembly is disposed in a retracted position.

DESCRIPTION OF THE PREFERRED EMBODIMENTS

Figure 1:
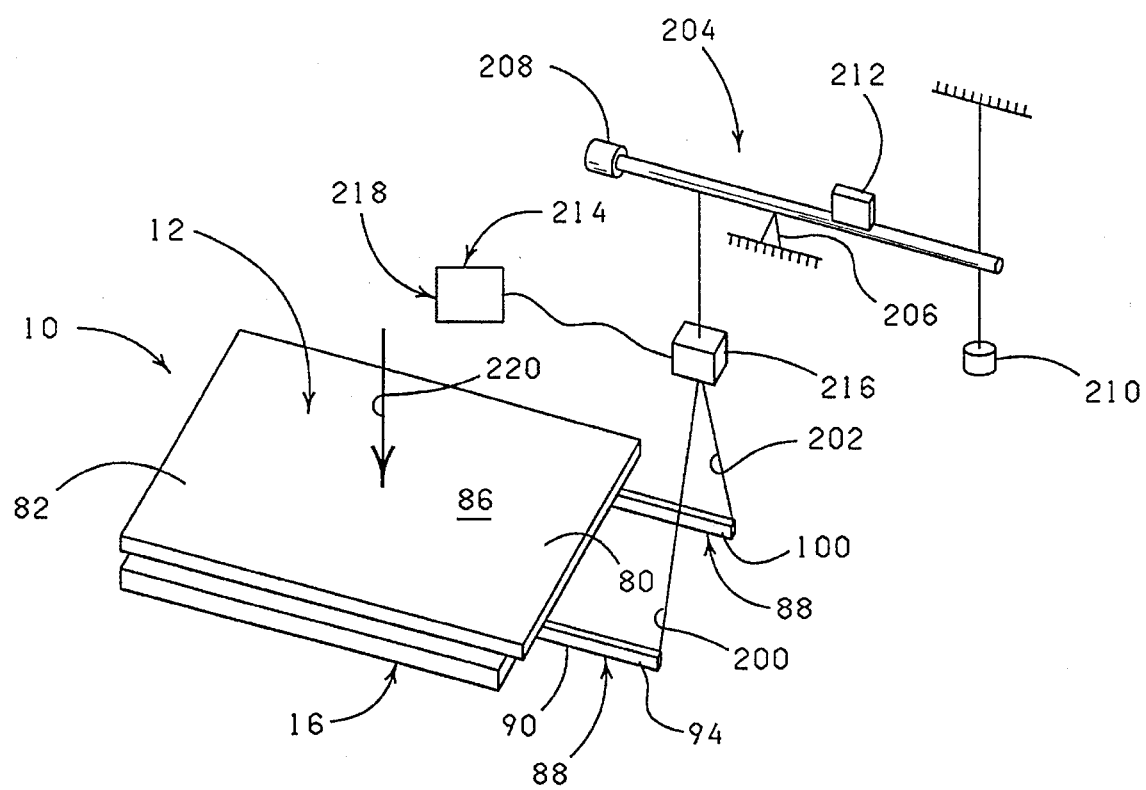
FIG. 1 is a diagrammatic, schematic view of a summing bar suspension scale constructed in accordance with the present invention.
Figure 2:
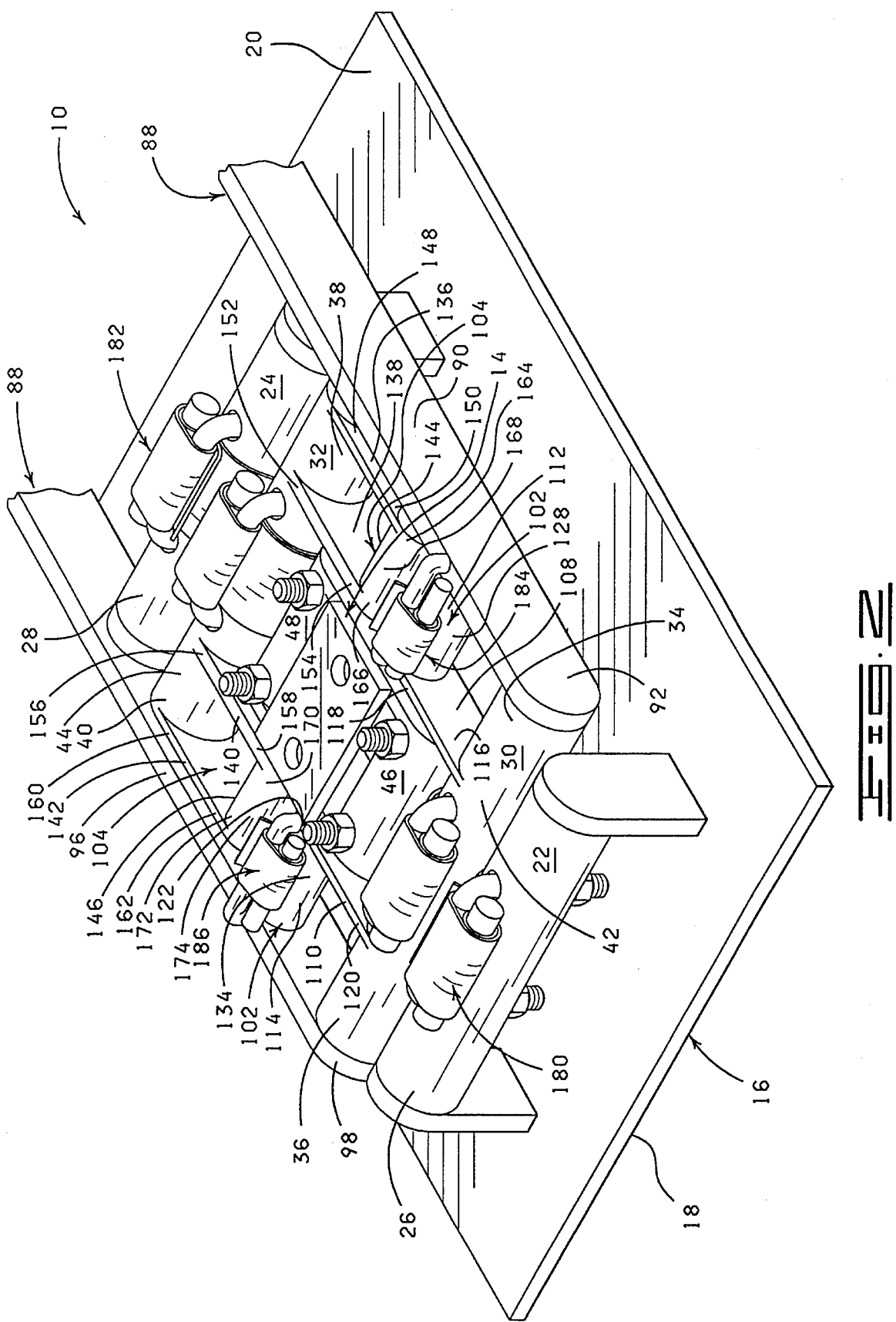
FIG. 2 is a perspective view of the summing bar suspension scale shown in FIG. 1 having a weight platform removed therefrom to illustrate the details of a frame, weighing bars and summing bar assemblies of the summing bar suspension scale.

Shown in FIG. 1 is a schematic, diagrammatic view of a summing bar suspension scale 10 constructed in accordance with the present invention; and FIG. 2 is a top plan view of the summing bar suspension scale 10 shown in FIG. 1, but having a weighing platform 12 of a platform support assembly 14 removed in order to more clearly show certain components of the summing bar suspension scale 10. The summing bar suspension scale 10 includes a support frame 16 having a first end 18 and a second end 20. A first connecting bar 22 is disposed near the first end 18 of the support frame 16 and a second connecting bar 24 is disposed near the opposite second end 20 of the support frame 16. The first and second connecting bars 22, 24 extend generally parallel with respect to the first and second ends 18, 20 of the support frame 16. The first and second connecting bars 22, 24 are desirably cylindrically shaped and have an outer peripheral surface 26, 28, respectively.

Figure 3:
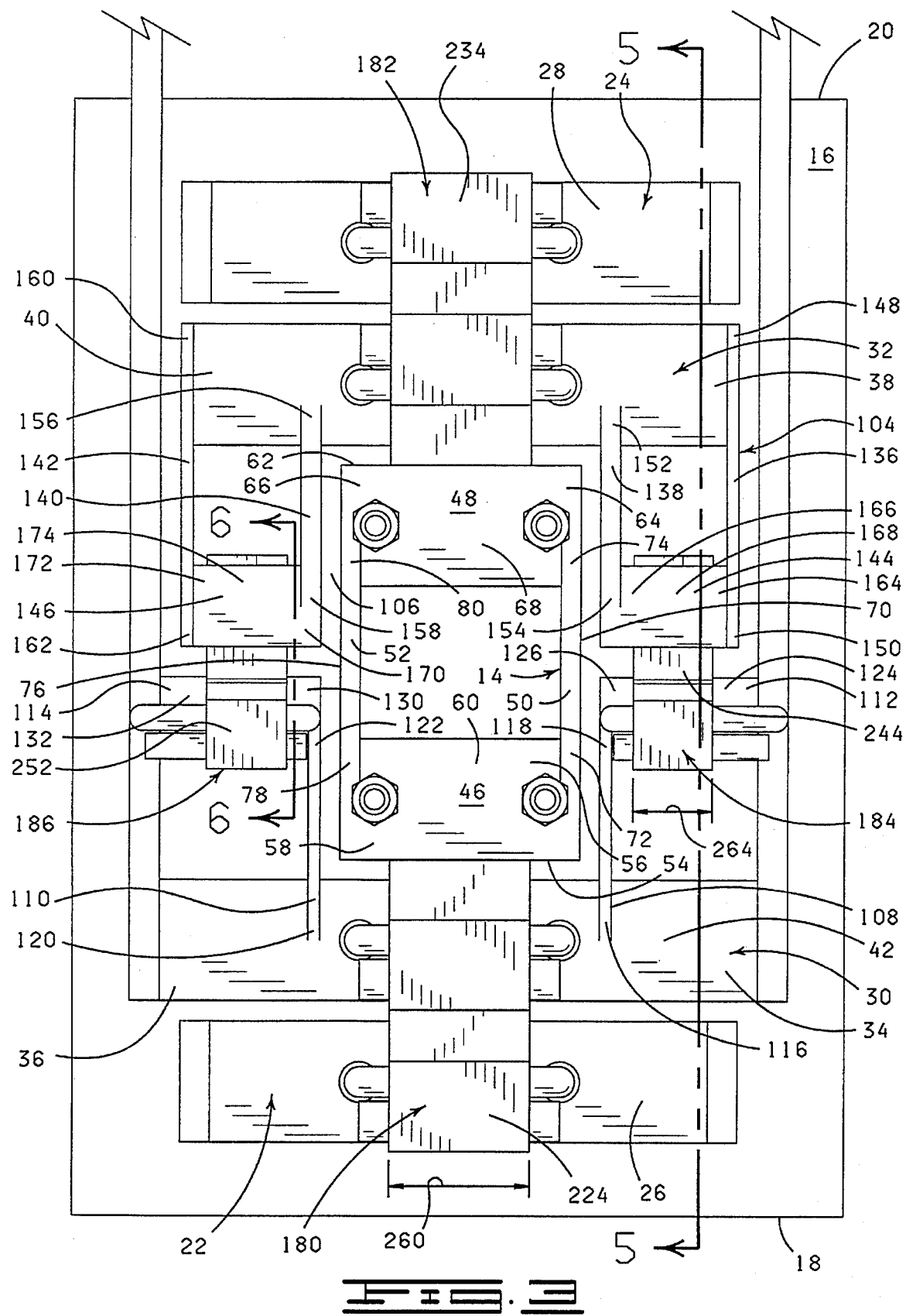
FIG. 3 is a top plan view of the summing bar suspension scale of FIG. 2 having an upper support plate of a platform support assembly removed therefrom.
Figure 6:
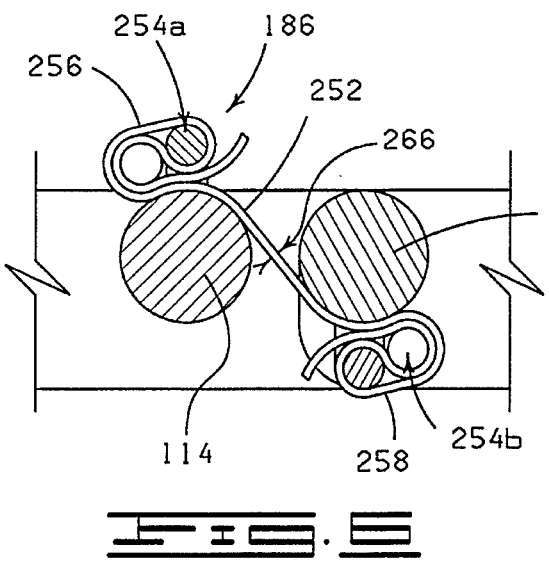
FIG. 6 is an enlarged, cross-sectional view taken along lines 6—6 of FIG. 3.

Referring more specifically to FIGS. 2, 3 and 6, a first weighing bar 30 is disposed near the first connecting bar 22 and a second weighing bar 32 is disposed near the second connecting bar 24. The first and second weighing bars 30, 32 extend generally parallel with respect to the first and second connecting bars 22, 24.

The first weighing bar 30 is cylindrically shaped and has a first end 34 and a second end 36. The second weighing bar 32 is also cylindrically shaped and has a first end 38 and a second end 40. The first weighing bar 30 has an outer peripheral surface 42 and the second weighing bar 32 has an outer peripheral surface 44.

The platform support assembly 14, which is adapted to supportingly receive the weighing platform 12 so that the weighing platform 12 is disposed a selected distance above the first and second weighing bars 30 and 32, is substantially centrally disposed between the first and second weighing bars 30, 32 substantially as shown in FIG. 3. The platform support assembly 14 includes a first bar member 46, a second bar member 48, a first connector member 50 and a second connector member 52. The first bar member 46, which defines a first end 54 of the platform support assembly 14, is cylindrically shaped and has a first end 56, a second end 58 and an outer peripheral surface 60. The second bar member 48, which defines a second end 62 of the platform support assembly 14, is also cylindrically shaped and has a first end 64, a second end 66 and an outer peripheral surface 68.

The first connector member 50, which defines a first side 70 of the platform support assembly 14, has a first end 72 and a second end 74; and the second connector member 52, which defines a second side 76 of the platform support assembly 14, has a first end 78 and a second end 80. The first end 72 of the first connector member 50 is rigidly connected to the first end 56 of the first bar member 46 and the second end 74 of the first connector member 50 is rigidly connected to the first end 64 of the second bar member 48. The first end 78 of the second connector member 52 is rigidly connected to the second end 58 of the first bar member 46 and the second end 80 of the second connector member 52 is rigidly connected to the second end 66 of the second bar member 48.

The weighing platform 12, which is generally rectangularly shaped, has a first end 82, a second end 84 and an upper surface 86. The weighing platform 12 is adapted to support an object to be weighed on the upper surface 86 during the weighing process.

The summing bar suspension scale 10 further includes a weighing arm assembly 88 connected to the first weighing bar 30. The weighing arm assembly 88 comprises a first weighing arm 90 having a first end 92 and a second end 94, and a spatially disposed second weighing arm 96 having a first end 98 and a second end 100. The first end 92 of the first weighing arm 90 is rigidly connected to the first end 34 of the first weighing bar 30. The first end 98 of the second weighing arm 96 is rigidly connected to the second end 36 of the first weighing bar 30. The first and second weighing arms 90, 96 extend from the first weighing bar 30 in the direction of the second weighing bar 32; and the first and second weighing arms 90, 96 are desirably provided with a length such that the second ends 94,100 of the first and second weighing arms 90 and 96 extend outwardly past the second connecting bar 24 substantially as shown.

A first summing bar assembly 102 is rigidly connected to the first weighing bar 30 and to the first and second weighing arms 90 and 96. A second summing bar assembly 104 is rigidly connected to the second weighing bar 32 so that the first and second summing bar assemblies 102 and 104 are aligned and disposed in a substantially facing relationship. Thus, the first and second summing bar assemblies 102 and 104 cooperate to define an opening 106 therebetween (FIG. 3) adapted to receive the platform support assembly 14.

The first summing bar assembly 102 includes a first support arm 108, a second support arm 110, a first summing bar 112 and a second summing bar 114. The first support arm 108 has a first end 116 and a second end 118; and the second support arm 110 has a first end 120 and a second end 122. The first end 116 of the first support arm 108 is rigidly connected to the first weighing bar 30 near the first end 34 thereof so that the second end 114 of the first support arm 108 is disposed between the first weighing arm 90 and the first side 70 of the platform support assembly 14.

The first end 120 of the second support arm 110 is rigidly connected to the first weighing bar 30 near the second end 36 thereof so that the second end 122 of the second support arm 110 is disposed between the second weighing arm 96 and the second side 76 of the platform support assembly 14.

The first summing bar 112 is cylindrically shaped and has a first end 124, a second end 126 and an outer peripheral surface 128. The second summing bar 114 is also cylindrically shaped and has a first end 130, a second end 132 and an outer peripheral surface 134. The first end 124 of the first summing bar 112 is rigidly connected to the first weighing arm 90 and the second end 118 of the first support arm 103.

The first end 130 of the second summing bar 114 is rigidly connected to the second end 122 of the second support arm 110 and the second end 132 of the second summing bar 114 is rigidly connected to the second weighing arm 96.

The second summing bar assembly 104 includes a first support arm 136, a second support arm 138, a third support arm 140, a fourth support arm 142, a first summing bar 144 and a second summing bar 146. The first support arm 136 of the second summing bar assembly 104 has a first end 148 and a second end 150; and the second support arm 138 has a first end 152 and a second end 154. The first end 148 of the first support arm 136 is rigidly connected to the first end 38 of the second weighing bar 32 so that the first support arm 136 is spatially disposed from the first weighing arm 90. The first end 152 of the second support arm 138 is rigidly connected to the second weighing bar 32 near the first end 38 thereof so that the second support arm 138 is spatially disposed from the first side 70 of the platform support assembly 14 and in a substantially parallel, spatial relationship with the first support arm 136.

The third support arm 140 of the second summing bar assembly 104 has a first end 156 and a second end 158; and the fourth support arm 142 has a first end 160 and a second end 162. The first end 156 of the third support arm 140 is rigidly connected to the second weighing bar 32 near the second end 40 thereof so that the third support arm 140 is spatially disposed from the second side 76 of the platform support assembly 14. The first end 160 of the fourth support arm 142 is rigidly connected to the second end 40 of the second weighing bar 32 so that the fourth support arm 142 is spatially disposed from the second weighing arm 96 and in a substantially parallel, spatial relationship with the third support arm 140.

The first summing bar 144 of the second summing bar assembly 104 is cylindrically shaped and has a first end 164, a second end 166 and an outer peripheral surface 168. The first end 164 of the first summing bar 144 is rigidly connected to the second end 150 of the first support arm 136 and the second end 166 of the first summing bar 144 is rigidly connected to the second end 154 of the second support arm 138 so that the first summing bar 144 of the second summing bar assembly 104 is disposed in a substantially parallel, facing relationship with the first summing bar 112 of the first summing bar assembly 102 substantially as shown.

The second summing bar 146 of the second summing bar assembly 104 is cylindrically shaped and has a first end 170, a second end 172 and an outer peripheral surface 174. The first end 170 of the second summing bar 146 is rigidly connected to the second end 158 of the third support arm 140 and the second end 172 of the second summing bar 146 is rigidly connected to the second end 162 of the fourth support arm 142 so that the second summing bar 146 of the second summing bar assembly 104 is disposed in a substantially parallel, facing relationship with the second summing bar 114 of the first summing bar assembly 102 substantially as shown.

The summing bar suspension scale 10 further includes a first strap assembly 180, a second strap assembly 182, and two summing bar strap assemblies 184 and 186. As more clearly shown in FIG. 5, the first strap assembly 180 is connected to the first connecting bar 22 on the first end 18 of the support frame 16, to the first weighing bar 30 and to the first bar member 46 of the platform support assembly 14 for rotatingly supporting the first weighing bar 30 such that the first weighing bar 30 is rotated in a direction 188 (FIG. 4) in response to a weight being disposed or imposed on the upper surface 86 of the weighing platform 12.

The second strap assembly 182 is connected to the second connecting bar 24 on the second end 20 of the support frame 16, to the second weighing bar 32 and to the second bar member 48 of the platform support assembly 14 for rotatingly supporting the second weighing bar 32 such that the second weighing bar 32 is rotated in a direction 190 (FIG. 4) in response to weight being disposed or imposed on the upper surface 86 of the weighing platform 12.

The summing bar strap assembly 184 is connected to the first summing bar 112 of the first summing bar assembly 102 and to the first summing bar 144 of the second summing bar assembly 104. The summing bar strap assembly 186 is connected to the second summing bar 114 of the first summing bar assembly 102 and to the second summing bar 146 of the second summing bar assembly 104. The interconnection of the first and second summing bar assemblies 102 and 104 by the summing bar strap assemblies 184 and 186 permit the first and second summing bars 144 and 146 of the first summing bar assembly 102 to be rotated in a direction 192 (FIG. 4) in response to a weight being disposed or imposed on the upper surface 86 of the weighing platform 12, and the first and second summing bars 144 and 146 of the second summing bar assembly 104 to be rotated in a direction 194 (FIG. 4) in response to a weight being disposed or imposed on the upper surface 86 of the weighing platform 12.

Referring more specifically to FIG. 1, one end of a flexible cable 200 is connected to the second end 94 of the first weighing arm 90 and one end of a flexible cable 202 is connected to the second end 100 of the second weighing arm 96. The opposite ends of the flexible cables 200 and 202 are connected to a conventional weighing beam 204.

The weighing beam 204 is balanced on a fixed knife edge support 206 with a zero balance tail ball 208 on one end and a balance to hold weight multipliers 210 at the opposite end. A movable poise 212 is positionable to provide the exact balance so the weight on the weighing platform 12 may be visually read from the weight graduation marks stamped on the weighing beam 204.

A weighing unit 214 is operatively connected to the summing bar suspension scale 10. In general, the weighing unit 214 comprises a transducer 216 and a weight processor 218. The weighing beam 204 is connected to the support frame 16 and the transducer 216 is interposed in the flexible cables 200 and 202, generally between the second ends 94 and 100 of the first and second weighing arms 90 and 96 and the weighing beam 204. By fixing the weighing beam 204 to the support frame 16, all of the forces transmitted through the flexible cables 200 and 202 are imposed on the transducer 216.

The transducer 216 is constructed and adapted to receive the mechanical forces transmitted through the flexible cables 200 and 202 which are proportional to the instantaneous weight of the object or weight on the weighing platform 12 at any given time and to output weight signals which are electrical signals indicative of the instantaneous weight on the weighing platform 12. The weight signals output by the transducer 216 are analog signals. However, it should be noted that the transducer 216 could be constructed to include an analog to digital section so the transducer 216 would output the weight signals in a digital format. The weight processor 218 outputs in a visually perceivable format the weight of the object on the weighing platform 12 and the weight processor 218 can output the weight on the weighing platform 12 in a visually perceivable format such as a printed format, for example.

Weight processors which are constructed and operate like the weight processor 218 just described are disclosed in detail in U.S. Pat. No. 4,836,304, issued to John Paul, Jun. 6, 1989 and the disclosure of this patent hereby specifically is incorporated herein by reference.

Figure 4:
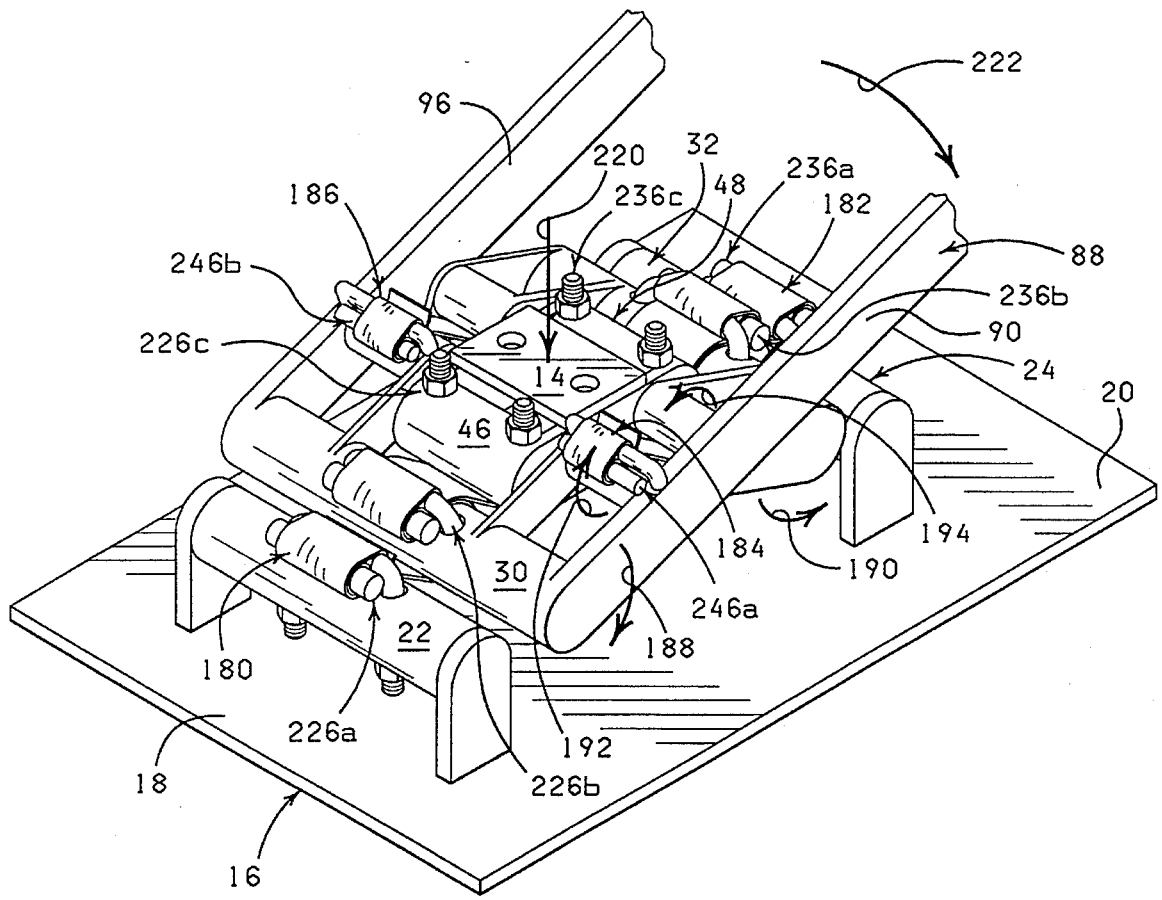
FIG. 4 is a perspective view of the summing bar suspension scale shown in FIG. 1 wherein components of the summing bar suspension scale are illustrated in an exaggerated position prior to weight being disposed on the weighing platform.

In operation, an object is placed on the weighing platform 12, thereby exerting a weight force on the weighing platform 12 in a general direction indicated by arrow 220 (FIG. 1). The weight force on the weighing platform 12 exerts force on the platform support assembly 14 which imparts rotational movement of the first and the second weighing bars 30 and 32 in the respective directions 188 and 190 (FIG. 4). These forces on the first and the second weighing bars 30 and 32 are summed by the first and second summing bar assemblies 102 and 104 and the summed forces result in the first and second weighing arms 90 and 96 being forced in a generally downwardly direction indicated by the arrow 222 (FIG. 4), thereby placing downwardly directed forces on the flexible cables 200 and 202 which are indicative of the instantaneous weight of the object on the weighing platform 12. In general, these downwardly directed forces are imposed on the weighing beam 204 and these forces are counter-balanced by the operator moving the poise 212 to provide the visually perceivable output indication of the weight of the object. In addition, the weighing unit 214 outputs the weight of the object in a visually perceivable format and/or in a printed format. It should be noted that while the weighing beam 204 and associated components have been described for providing either a visual or electronic readout of the weight on the weighing platform 12 of the summing bar suspension scale 10, other assemblies such as load cells, strain gauges and the like can be connected to the flexible cables 200 and 202 to provide visual or electronic readout of the weight imposed on the weighing platform 12. It should be further noted that the interconnection of the first and second summing bar assemblies 102 and 104 to the first and second weighing bars 30 and 32 as herein described substantially reduces the leverage on the first and second weighing bars 30 and 32 which in turn reduces the load on the weighing beam 204, load cell or strain gauge by a predetermined leverage ratio.

Figure 5:
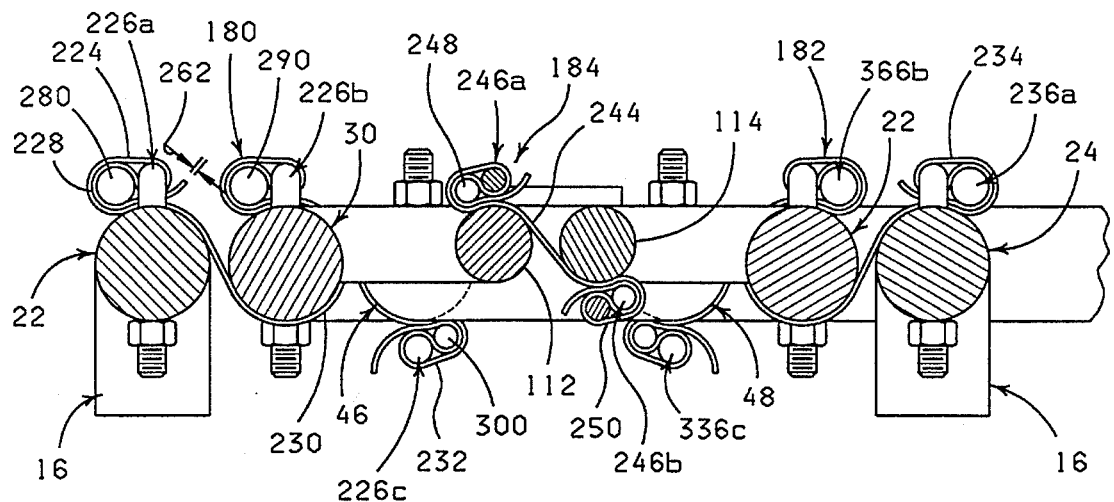
FIG. 5 is a sectional view taken substantially along lines 5—5 of FIG. 3 showing strap assemblies for interconnection of the frame, the weight bars and the platform support assembly.
Figure 7:
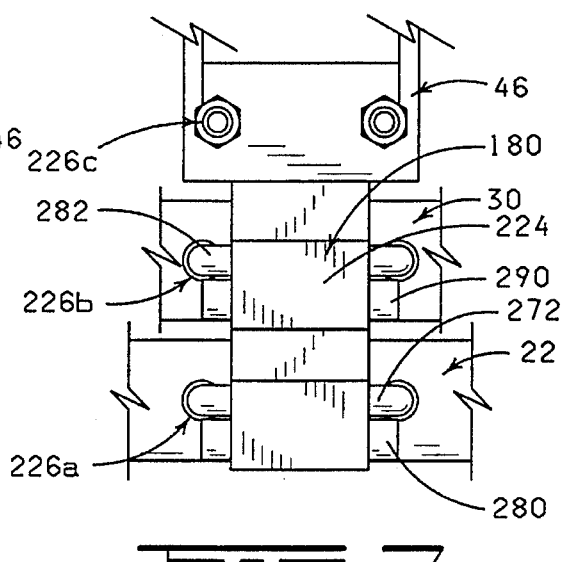
FIG. 7 is a top plan view of a strap assembly for connecting a forward end, a weight bar and the platform support assembly of the summing bar suspension scale shown in FIG. 1.
Figure 8:
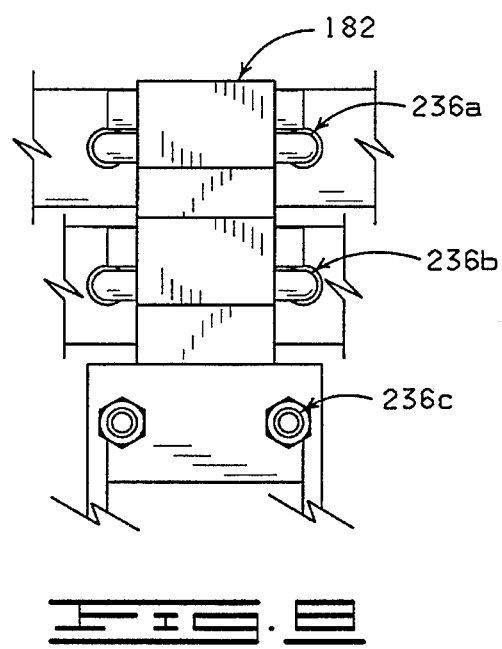
FIG. 8 is a top plan view of a second strap assembly for connecting a rearward end of the frame, a weight bar and the platform support assembly of the summing bar suspension scale shown in FIG. 1.

The first strap assembly 180 is shown in greater detail in FIGS. 5 and 7, and the second strap assembly 182 is shown in greater detail in FIGS. 5 and 8. The first strap assembly 180 comprises a strap 224 and three clamp assemblies 226 with the individual clamp assemblies being designated in FIGS. 5 and 7 by the respective reference numerals 226a, 226b and 226c.

The strap 224 has a first end portion 228, a medial portion 230 and a second end portion 232. The first end portion 228 of the strap 224 is connected to the first connecting bar 22 of the support frame 16 by way of the clamp assembly 226a and the medial portion 230 of the strap 224 is connected to the first weighing bar 30 by way of the clamp assembly 226b. The second end portion 232 of the strap 224 is connected to the first bar member 46 of the platform support assembly 14 by way of the clamp assembly 226c.

The second strap assembly 182 comprises a strap 234 and three clamp assemblies 236 with the individual clamp assemblies being designated in FIGS. 5 and 8 by the respective reference numerals 236a, 236b and 236c.

The strap 234 has a first end portion 238, a medial portion 240 and a second end portion 240. The first end portion 238 of the strap 234 is connected to the second connecting bar 24 of the support frame 16 by way of the clamp assembly 236a and the medial portion 240 of the strap 234 is connected to the second weighing bar 32 by way of the clamp assembly 236b. The second end portion 240 of the strap 234 is connected to the second bar member 48 of the platform support assembly 14 by way of the clamp assembly 236c.

The summing bar strap assembly 18.4 is shown in greater detail in FIG. 5; and the summing bar strap assembly 186 is shown in greater detail in FIG. 6. The summing bar strap assembly 184 comprises a strap 244 and two clamp assemblies 246 with the individual clamp assemblies being designated by the respective reference numerals 246a and 246b.

The strap 244 of the summing bar strap assembly 184 has a first end portion 248 and a second end portion 250. The first end portion 248 of the strap 244 is connected to the first summing bar 112 of the first summing bar assembly 102 by way of the clamp assembly 246a; and the second end portion 250 of the strap 244 is connected to the first summing bar 144 of the second summing bar assembly 104 by way of the clamp assembly 246b.

The summing bar strap assembly 186 also comprises a strap 252 and two clamp assemblies 254 with the individual clamp assemblies being designated by the reference numerals 254a and 254b. The strap 252 of the summing bar assembly 186 has a first end portion 256 and a second end portion 258. The first end portion 256 of the strap 252 is connected to the second summing bar 114 of the first summing bar assembly 102 by way of the clamp assembly 254a; and the second end portion 258 of the strap 252 is connected to the second summing bar 146 of the second summing bar assembly 104 by way of the clamp assembly 254b. The straps 224 and 234 and the straps 244 and 252 are substantially identical in construction and operation and the clamp assemblies 226, 236, 246 and 254 are substantially identical in construction and operation.

Each of the straps 224, 234, 244 and 252 has a generally rectangularly shaped cross-section. Each of the straps 224 and 234 has a length, a width 260 and a thickness 262, the width 260 being shown in FIG. 1 with respect to the strap 224 and the thickness 262 being shown in FIG. 5 with respect to the strap 224. Each of the straps 244 and 252 has a length, a width 264 and a thickness 266, the width 264 being shown in FIG. 3 with respect to strap 244 and the thickness 266 being shown in FIG. 6 with respect to the strap 244. In one preferred embodiment, the width 260 of the straps 224 and 234 is about 1⅝ inches, and the thicknesses 262 and 266 of each of the straps 224, 234, 244 and 252 is about ⅙th inch. The width 260 of each of the straps 224 and 226, and the width 264 of each of the straps 244 and 252 is about 25 times greater than the thicknesses 262 and 266. The width 260 and 264 preferably is at least two times greater than the thicknesses 264 and 266.

Each of the straps 224 and 234 has a substantially flat upper surface and a substantially flat lower surface forming the width 260 of the straps 224 and 234. Each of the straps 244 and 252 also has a substantially flat upper surface and a substantially flat lower surface forming the width 264 of the straps 244 and 252. The edges of each of the straps 224, 234, 244 and 252 also preferably are substantially flat to form the rectangularly shaped cross-section; however, the edges may be rounded and the term "rectangularly shaped" as used herein is intended to cover flat or rounded edges of the straps 224, 234, 244 and 252.

The straps 224, 234, 244 and 252 preferably are constructed of a material fabricated from a plurality of individual metal or plastic strands woven and interconnected, such as Kevlar® aramid fibers, Kevlar® aramid fibers being a product of E. I. du Pont de Nemours and Co. (Inc.) of Wilmington, Del. with the Kevlar® aramid fibers being intertwined to form narrow webbing with such narrow webbing comprising the straps. The narrow webbing Kevlar® product is commercially available from Bally Ribbon Mills, pattern 2309. As used herein, the term Kevlar® means the Kevlar® produced by DuPont or the equivalent.

When the Kevlar® webbing is cut to form the straps 224, 234, 244 and 252, the cut ends of the webbing tend to become frayed. Therefore, each end of the straps 224, 234, 244 and 252 preferably are dipped into an elastomeric or cold tar compound which will harden to some degree and cooperate to adhesively connect the frayed ends and substantially prevent further fraying. Further, the exposed portions of the straps 224, 234, 244, and 252 preferably are dipped in an elastomeric or coal tar compound to protect the individual strands from being cut by sharp objects.

Figure 9:
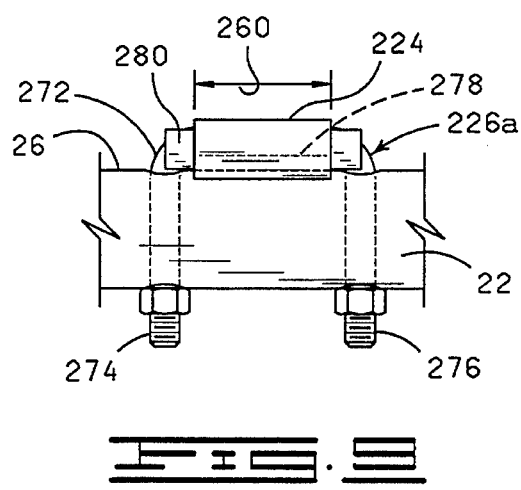
FIG. 9 is an end view of the strap assembly of FIG. 7 showing the connection of the strap assembly to a forward end of the frame.

As previously stated, the first strap assembly 180 comprises the strap 224 and three clamp assemblies 226 with the individual clamp assemblies being designated by the reference numerals 226a, 226b and 226c. The clamp assembly 226a (FIG. 9) comprises a U-shaped rod 272 having opposite ends 274 and 276. Portions of the U-shaped rod 272 extend through the first connecting bar 22 of the support frame 16 and are secured to the first connecting bar 22 in such a manner that a portion of the U-shaped rod extends a distance above the outer peripheral surface 26 of the first connecting bar 22 so as to form a strap opening 278 (shown by phantom lines) sized to slidably receive a portion of the strap 224.

The clamp assembly 226a also includes a cylindrically shaped retaining rod 280. The retaining rod 280 is disposed near the U-shaped rod 272 and extends generally across the strap opening 278.

Figure 10:
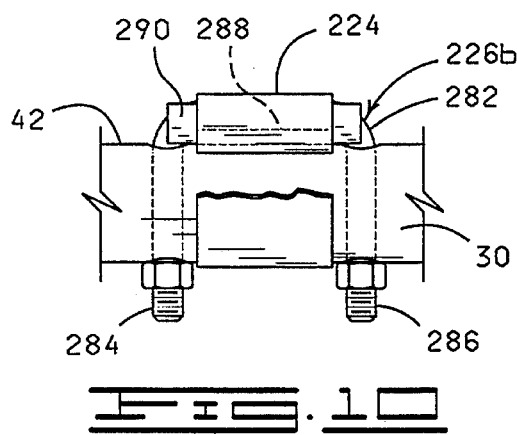
FIG. 10 is an end view of the strap assembly of FIG. 7 showing the connection of the strap assembly to the weight bar.

The clamp assembly 226b (FIG. 10) comprises a U-shaped rod 282 having opposite ends 284 and 286. Portions of the U-shaped rod 282 extend through the first weighing bar 30 and are secured to the first weighing bar 30 in such a manner that a portion of the U-shaped rod extends a distance above the outer peripheral surface 42 of the first weighing bar 30 so as to form a strap opening 288 (shown by phantom lines) sized to slidably receive a portion of the strap 224.

The clamp assembly 226b also includes a cylindrically shaped retaining rod 290. The retaining rod 290 is disposed near the U-shaped rod 282 and extends generally across the strap opening 288.

Figure 11:
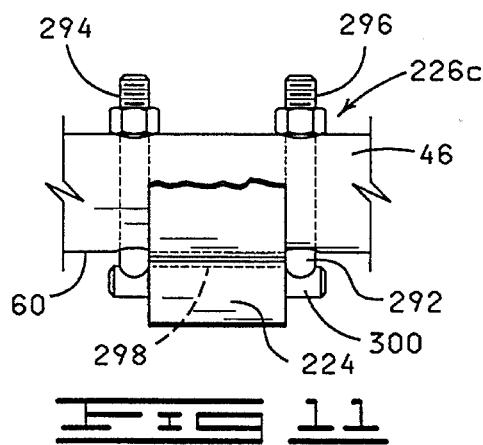
FIG. 11 is an end view of the strap assembly of FIG. 7 showing the connection of the strap assembly to a forward end of the platform support assembly.

The clamp assembly 226c (FIG. 11) also comprises a U-shaped rod 292 having opposite ends 294 and 296. Portions of the U-shaped rod 292 extend through the first bar member 46 of the platform support assembly 14 and are secured to the first bar member 46 in such a manner that a portion of the U-shaped rod extends a distance below the outer peripheral surface 60 of the first bar member 46 so as to form a strap opening 298 (shown by phantom lines) sized to slidably receive a portion of the strap 224.

The clamp assembly 226c also includes a cylindrically shaped retaining rod 300. The retaining rod 300 is disposed near the U-shaped rod 292 and extends generally across the strap opening 298.

Referring now to FIGS. 5 and 9–11, to interconnect the support frame 16, the first weighing bar 30 and the first end 54 of the platform assembly 14, one end of the strap 224 extends through the strap opening 278 of the clamp assembly 226a and extends about a portion of the outer peripheral surface of the retaining rod 280 and back through the strap opening 278. The strap 224 then extends about a portion of the outer peripheral surface of the U-shaped rod 280 and about the retaining rod for a second time and back through the strap opening 278 for connection to the clamp assembly 226b. Thus, when a force is imposed tending to pull the strap 224 out of the strap opening 278, the retaining rod 280 jams against the U-shaped rod 272 for securely connecting the strap 224 to the first end 18 of the support frame 16 by way of the first connecting bar 22 and the clamp assembly 226a.

The strap 224 then extends under the first weighing bar 30 and through the strap opening 288 of clamp assembly 226b and extends about a portion of the outer peripheral surface of the retaining rod 290 and a portion of the outer peripheral surface of the U-shaped rod 282 and back through the strap opening 288. The strap 224 then extends about a portion of the outer peripheral surface of the retaining rod 290 for a second time and back through the strap opening 288 for connection to the clamp assembly 226c. Thus, when a force is imposed tending to pull the strap 224 out of the strap opening 288, the retaining rod 290 jams against the U-shaped rod 282 for securely connecting the strap 224 to first weighing bar 30 by way of the clamp assembly 226b.

The strap 224 then extends under the first bar member 46 defining the first end 54 of the platform support assembly 14 and through the strap opening 298 of clamp assembly 226c and extends about a portion of the outer peripheral surface of the retaining rod 300 and a portion of the outer peripheral surface of the U-shaped rod 292 and back through the strap opening 298. The strap 224 then extends about a portion of the outer peripheral surface of the retaining rod 300 for a second time and back through the strap opening 298. Thus, when a force is imposed tending to pull the strap 224 out of the strap opening 298, the retaining rod 290 jams against the U-shaped rod 292 for securely connecting the strap 224 to first end 54 of the platform support assembly 14 by way of the clamp assembly 226c.

Figure 12:
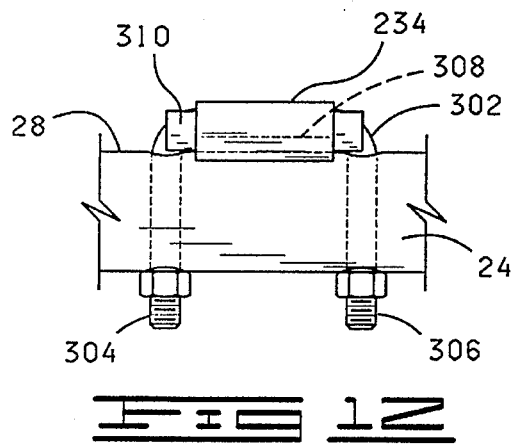
FIG. 12 is an end view of the strap assembly of FIG. 7 showing the connection of the strap assembly to the rearward end off the frame.

The second strap assembly 182, which interconnects the second end 20 of the support frame 16, the second weighing bar 32 and the second end 62 of the platform support assembly 14 comprises the strap 234 and three clamp assemblies 236 with the individual clamp assemblies being designated by the reference numerals 236a, 236b and 236c. The clamp assembly 236a (FIG. 12) comprises a U-shaped rod 302 having opposite ends 304 and 306. Portions of the U-shaped rod 302 extend through the second connecting bar 24 of the support frame 16 and are secured to the second connecting bar 24 in such a manner that a portion of the U-shaped rod 302 extends a distance above the outer peripheral surface 28 of the second connecting bar 24 so as to form a strap opening 308 (shown by phantom lines) sized to slidably receive a portion of the strap 234.

The clamp assembly 236a also includes a cylindrically shaped retaining rod 310. The retaining rod 310 is disposed near the U-shaped rod 302 and extends generally across the strap opening 308.

Figure 13:
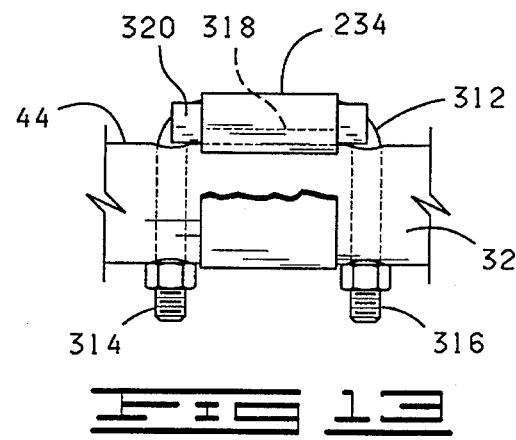
FIG. 13 is an end view of the strap assembly of FIG. 12 showing the connection of the strap assembly to a weight bar.

The clamp assembly 236b (FIG. 13) comprises a U-shaped rod 312 having opposite ends 314 and 316. Portions of the U-shaped rod 312 extend through the second weighing bar 32 and are secured to the second weighing bar 32 in such a manner that a portion of the U-shaped rod 312 extends a distance above the outer peripheral surface 44 of the second weighing bar 32 so as to form a strap opening 318 (shown by phantom lines) sized to slidably receive a portion of the strap 234.

The clamp assembly 236b also includes a cylindrically shaped retaining rod 320. The retaining rod 320 is disposed near the U-shaped rod 312 and extends generally across the strap opening 318.

Figure 14:
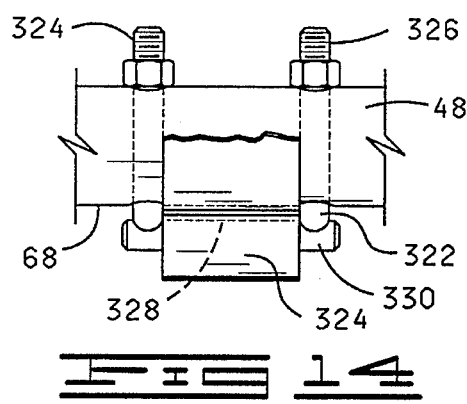
FIG. 14 is an end view of the strap assembly of FIG. 12 showing the connection of the strap assembly to a rearward end of the platform support assembly.

The clamp assembly 236c (FIG. 14) also comprises a U-shaped rod 322 having opposite ends 324 and 326. Portions of the U-shaped rod 322 extend through the second bar member 48 of the platform support assembly 14 and are secured to the second bar member 48 in such a manner that a portion of the U-shaped rod 322 extends a distance below the outer peripheral surface 68 of the second bar member 48 so as to form a strap opening 328 (shown by phantom lines) sized to slidably receive a portion of the strap 234.

The clamp assembly 236c also includes a cylindrically shaped retaining rod 330. The retaining rod 330 is disposed near the U-shaped rod 322 and extends generally across the strap opening 328.

Referring now to FIGS. 5 and 12–14, to interconnect the support frame 16, the second weighing bar 32 and the second end 62 of the platform assembly 14, one end of the strap 234 extends through the strap opening 308 of clamp assembly 236a and extends about a portion of the outer peripheral surface of the retaining rod 310 and back through the strap opening 308. The strap 234 then extends about a portion of the outer peripheral surface of the U-shaped rod 302 and about the retaining rod 310 for a second time and back through the strap opening 308 for connection to the clamp assembly 236b. Thus, when a force is imposed tending to pull the strap 234 out of the strap opening 308, the retaining rod 310 jams against the U-shaped rod 302 for securely connecting the strap 234 to the second end 20 of the support frame 16 by way of the second connecting bar 24 and the clamp assembly 236a.

The strap 234 then extends under the second weighing bar 32 and through the strap opening 318 of clamp assembly 236b and extends about a portion of the outer peripheral surface of the retaining rod 320 and a portion of the outer peripheral surface of the U-shaped rod 312 and back through the strap opening 318. The strap 234 then extends about a portion of the outer peripheral surface of the retaining rod 320 for a second time and back through the strap opening 318 for connection to the clamp assembly 236c. Thus, when a force is imposed tending to pull the strap 234 out of the strap opening 318, the retaining rod 320 jams against the U-shaped rod 312 for securely connecting the strap 234 to the second weighing bar 32 by way of the clamp assembly 236b.

The strap 234 then extends under the second bar member 48 defining the second end 62 of the platform support assembly 14 and through the strap opening 328 of clamp assembly 236c and extends about a portion of the outer peripheral surface of the retaining rod 330 and a portion of the outer peripheral surface of the U-shaped rod 322 and back through the strap opening 328. The strap 234 then extends about a portion of the outer peripheral surface of the retaining rod 330 for a second time and back through the strap opening 328. Thus, when a force is imposed tending to pull the strap 234 out of the strap opening 328, the retaining rod 330 jams against the U-shaped rod 322 for securely connecting the strap 234 to second end 62 of the platform support assembly 14 by way of the clamp assembly 236c.

Figure 15:
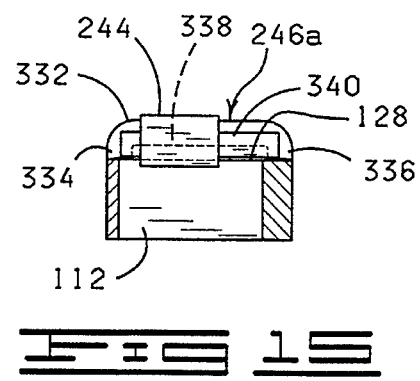
FIG. 15 is an end view of a first summing bar strap assembly showing the connection of the first summing bar strap assembly to a first summing bar of a first summing bar assembly of the summing bar suspension scale shown in FIG. 1
Figure 16:
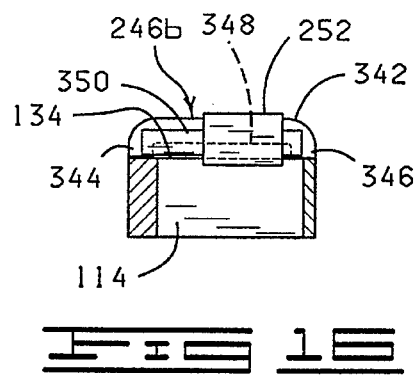
FIG. 16 is an end view of a second summing bar strap assembly showing the connection of the second summing bar strap assembly to a second summing bar of a first summing bar assembly of the summing bar suspension scale shown in FIG. 1.
Figure 17:
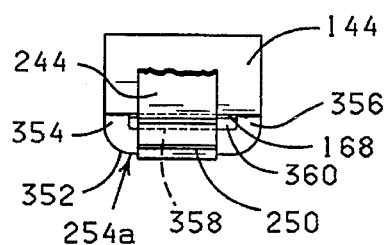
FIG. 17 is an end plan view of the first summing bar strap assembly for connecting the first summing bar strap assembly to a first summing bar of a second summing bar assembly of the summing bar suspension scale shown in FIG. 1.
Figure 18:
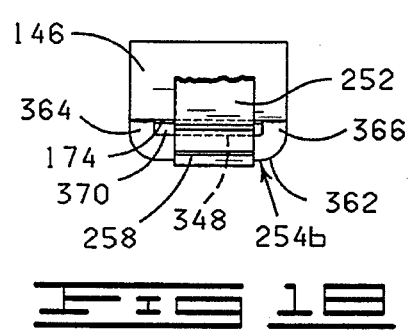
FIG. 18 is an end plan view of the second summing bar strap assembly for connecting the second summing bar strap assembly to the second summing bar of a second summing bar assembly of the summing bar suspension scale shown in FIG. 1

The clamp assemblies 246a and 254a for connecting the first and second end portions 248 and 250 of the strap 244 to the first summing bar 112 of the first summing bar assembly 102 and to the first summing bar 144 of the second summing bar assembly 104 are shown in greater detail in FIGS. 15 and 16; and the clamp assemblies 246b and 254b for connecting the first and second end portions 256 and 258 of the strap 252 to the second summing bar 114 of the first summing bar assembly 102 and to the second summing bar 146 of the second summing bar assembly 104 are also shown in greater detail in FIGS. 17 and 18.

The clamp assembly 246a (FIG. 15) comprises a U-shaped rod 332 having opposite ends 334 and 336 connected to the first summing bar 112 in such a manner that a portion of the U-shaped rod 332 extends a distance above the outer peripheral surface 128 of the first summing bar 112 so as to form a strap opening 338 (shown by phantom lines) sized to slidably receive a portion of the first end portion 248 of the strap 244.

The clamp assembly 246a also includes a cylindrically shaped retaining rod 340. The retaining rod 340 is disposed near the U-shaped rod 332 and extends generally across the strap opening 338.

The clamp assembly 246b (FIG. 16) comprises a U-shaped rod 342 having opposite ends 344 and 346 connected to the second summing bar 114 in such a manner that a portion of the U-shaped rod 342 extends a distance above the outer peripheral surface 134 of the second summing bar 114 so as to form a strap opening 348 (shown by phantom lines) sized to slidably receive a portion of the first end portion 256 of the strap 252.

The clamp assembly 246b also includes a cylindrically shaped retaining rod 350. The retaining rod 350 is disposed near the U-shaped rod 342 and extends generally across the strap opening 348.

The clamp assembly 254a (FIG. 17) comprises a U-shaped rod 352 having opposite ends 354 and 356 connected to the first summing bar 144 in such a manner that a portion of the U-shaped rod 352 extends a distance below the outer peripheral surface 168 of the first summing bar 144 so as to form a strap opening 358 (shown by phantom lines) sized to slidably receive a portion of the second end portion 250 of the strap 244.

The clamp assembly 254a also includes a cylindrically shaped retaining rod 360. The retaining rod 360 is disposed near the U-shaped rod 352 and extends generally across the strap opening 358.

The clamp assembly 254b (FIG. 18) comprises a U-shaped rod 362 having opposite ends 364 and 366 connected to the second summing bar 146 in such a manner that a portion of the U-shaped rod 362 extends a distance below the outer peripheral surface 174 of the second summing bar 146 so as to form a strap opening 348 (shown by phantom lines) sized to slidably receive a portion of the second end portion 258 of the strap 252.

The clamp assembly 254b also includes a cylindrically shaped retaining rod 370. The retaining rod 370 is disposed near the U-shaped rod 362 and extends generally across the strap opening 368.

Referring now to FIGS. 5, 15 and 16, to interconnect the first summing bar 112 of the first summing bar assembly 102 to the first summing bar 144 of the second summing bar assembly 104 by way of the strap 244, the first end portion 248 of the strap 244 extends through the strap opening 338 of clamp assembly 246a and extends about a portion of the outer peripheral surface of the retaining rod 340 and a portion of the outer peripheral surface of the U-shaped rod 332 and back through the strap opening 338. The first end portion 248 of the strap 244 then extends about a portion of the outer peripheral surface of the retaining rod 340 for a second time and back through the strap opening 338 for connection of the first end portion 250 of the strap 244 to the clamp assembly 246a. Thus, when a force is imposed tending to pull the strap 244 out of the strap opening 338, the retaining rod 340 jams against the U-shaped rod 332 for securely connecting the strap 244 to the first summing bar 112 of the first summing bar assembly 102 by way of the clamp assembly 246a.

The second end portion 250 of the strap 244 extends through the strap opening 358 of clamp assembly 254a and extends about a portion of the outer peripheral surface of the retaining rod 360 and a portion of the outer peripheral surface of the U-shaped rod 352 and back through the strap opening 358. The second end portion 250 of the strap 244 then extends about a portion of the outer peripheral surface of the retaining rod 360 for a second time and back through the strap opening 358. Thus, when a force is imposed tending to pull the strap 244 out of the strap opening 358, the retaining rod 360 jams against the U-shaped rod 352 for securely connecting the second end portion 250 of the strap 244 to the first summing bar 144 of the second summing bar assembly 104.

Referring now to FIGS. 6, 17 and 18, to interconnect the first summing bar 112 of the first summing bar assembly 102 to the first summing bar 144 of the second summing bar assembly 104 by way of the strap 252, the first end portion 256 of the strap 252 extends through the strap opening 348 of clamp assembly 246b and extends about a portion of the outer peripheral surface of the retaining rod 350 and a portion of the outer peripheral surface of the U-shaped rod 342 and back through the strap opening 348. The first end portion 256 of the strap 252 then extends about a portion of the outer peripheral surface of the retaining rod 350 for a second time and back through the strap opening 348 for connection of the first end portion 256 of the strap 252 to the clamp assembly 246b. Thus, when a force is imposed tending to pull the strap 252 out of the strap opening 348, the retaining rod 350 jams against the U-shaped rod 342 for securely connecting the strap 252 to the second summing bar 114 of the first summing bar assembly 102 by way of the clamp assembly 246b.

The second end portion 258 of the strap 252 extends through the strap opening 368 of clamp assembly 254b and extends about a portion of the outer peripheral surface of the retaining rod 370 and a portion of the outer peripheral surface of the U-shaped rod 362 and back through the strap opening 368. The second end portion 258 of the strap 252 then extends about a portion of the outer peripheral surface of the retaining rod 370 for a second time and back through the strap opening 368 for connection of the second end portion 258 of the strap 252 to the clamp assembly 254b. Thus, when a force is imposed tending to pull the strap 252 out of the strap opening 368, the retaining rod 370 jams against the U-shaped rod 362 for securely connecting the strap 252 to the second summing bar 146 of the second summing bar assembly 104.

While the first and second strap assemblies 180 and 182, as well as the summing bar strap assemblies 184 and 186, have been described as utilizing clamp assemblies having a U-shaped rod and a retaining rod, it is to be understood that any suitable clamp assembly capable of securing the straps to their associated members can be employed in the practice of the invention. Additional clamp assemblies which may be employed in the practice of the present invention are described in detail in U.S. Pat. No. 5,205,370, issued to John Paul et al., Apr. 27, 1993, and the disclosure of this patent specifically is incorporated herein by reference.

It should be noted that one can provide a compound scale by employing two or more of the summing bar suspension scales 10 of the present invention. That is, to provide a compound scale, the second ends 94 and 100 of the first and second weighing arms 90 and 96, respectively, are positioned on the weighing platform 14 of an adjacently disposed summing bar suspension scale 10. The flexible cables 200 and 202 are connected to the first and second weighing arms 90 and 96 of the terminal summing bar suspension scale as heretofore described. Thus, when an object is imposed on the weighing platform 14 of the first summing bar suspension scale 10, the weighing arms 90 and 96 of such first summing bar suspension scale 10 impose a load on the weighing platform on the adjacently disposed or terminal summing bar suspension scale 10 and thus provides a compound scale.

Figure 19:
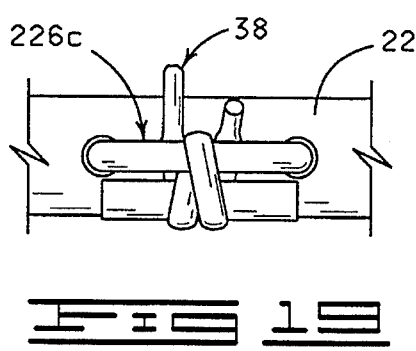
FIG. 19 is a modified strap assembly of the summing bar suspension scale of the present invention wherein straps of the strap assembly are provided with a substantially circularly shaped cross-section.

Shown in FIG. 19 is a modified strap 380. The modified strap 380 is connected to the components of the summing bar suspension scale 10, such as the first connecting bar 22, the first weighing bar 30 and the first bar member 46, in a manner exactly like that described before with respect to the straps 224, 234, 244 and 252. However, the strap 380 may be fabricated of one or more elements, each element having a circularly shaped cross-section. The strap 380 having the circularly shaped cross-section desirably is constructed of metal or plastic strands and more desirably of a plurality of such strands woven and interconnected, such as Kevlar® fibers or the equivalent cord constructed of Kevlar® fibers which is commercially available from Bally Ribbon Mills.

Referring now to FIG. 20, an animal holding chute 390 having one or more of the summing bar suspension scales 10 of the present invention incorporated therein is shown. The animal holding chute 390 has a first side 392, a spatially disposed second side 394, a forward end 396 and a rearward end 398. The animal holding chute 390 is of conventional construction and adapted to restrain an animal therein in a substantially stable position.

The summing bar suspension scales 10 are disposed within the animal holding chute 390 so that the weighing platform 12 provides a floor 400 extending between the first and second sides 392, 394 and the forward and rearward ends 396 and 398 of the animal holding chute. That is, the weighing platform 12 of the summing bar suspension scales 10 functions as the floor 400 for the animal holding chute 390.

As previously stated, one or more of the summing bar suspension scale 10 can be employed in combination with the animal holding chute 390 and, if more than one of the summing bar suspension scales 10 is employed, the weighing platform 12 is connected to each of the platform support assemblies 14 of the summing bar suspension scales 10 substantially as shown in FIG. 21. For example, if one were to employ four summing bar suspension scales 10 in combination with one weighing platform 12, the weighing arm assemblies 88 of adjacently disposed summing bar suspension scales 10 can be interconnected by connecting rods 442 and 444 substantially as shown. In such event, the one end of the flexible cable 200 would be connected to the connecting rod 442 and one end of the flexible cable 202 would be connected to the connecting rod 444 substantially as shown. The flexible cables 200, 202 are then connected to a weight measuring unit 445, such as a load cell or any other assembly as heretofore described capable of measuring the weight of an animal placed on the weighing platform 12.

Referring now to FIG. 22, the summing bar suspension scale 10 of the present invention is schematically shown in combination with a refuse collection vehicle 450. The refuse collection container includes a main frame 452, a container supporting frame 454 and a container 456. One or more of the summing bar suspension scales 10 is disposed on the container supporting frame 454 so as to be in supporting engagement with the container 456. Thus, the weight of the container 456 and the refuse contained therein can be readily determined by the summing bar suspension scale 10. However, because of jarring which occurs due to travel of the refuse collection vehicle 450, it is desirable that the summing bar suspension scales 10 be employed in combination with a suitable lifting assembly so that weight is not placed on the weighing platform 12 of the summing bar suspension scales 10 until the lifting assemblies are activated to supportingly engage and lift the container from the container supporting frame 454 of the vehicle.

Referring now to FIGS. 23 and 24, two scale assemblies, such as two summing bar suspension scales 10 are schematically shown in combination with the refuse collection vehicle 450.

The summing bar suspension scales 10 are connected to and supported on the main frame 452 of the refuse collection vehicle 450 so as to be disposed below the container 456. A lifting assembly, such as a hydraulic or pneumatic cylinder 460, is connected to the weighing platform 12 of each of the summing bar suspension scales 10 in a conventional manner. The cylinders 460 are selectively movable between a retracted position wherein the container 456 is supported on the container supporting frame 454 (FIG. 23), and an extended position wherein the cylinders 460 engage the container 456 and lifts the container 456 from supporting engagement with the container supporting frame 454 so that the weight of refuse contained within the container 456 is supported by the summing bar suspension scale 10 can be determined (FIG. 24).

Referring now to FIG. 25, the refuse collecting vehicle 450 is schematically shown in combination with two scale assemblies 500 and two lifting assemblies 502. In this embodiment, the scale assemblies 500 are supported on the lifting assemblies so that upon activation of the lifting assemblies 502 the scale assemblies 500 supportingly engage the container 456 and lift the container 456 so that the weight of the container 456 is placed or imposed on the scale assemblies 500. Any lifting assembly capable of causing the weighing assemblies to selectivly engage and raise the container 456 from supporting engagement with the container supporting frame 454 can be employed as the lifting assembly 502. Similarly, any scale assembly capable of measuring the weight of the container 456 such as summing bar scale assembly 10 of the present invention, load cells and the like can be employed as the scale assembly 500.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. A summing bar suspension scale for weighing an object, comprising:

a support frame having a first end and a second end;

a first weighing bar having a first end and a second end, the first weighing bar disposed near the first end of the support frame;

a second weighing bar having a first end and a second end, the second weighing bar disposed near the second end of the support frame;

a platform support assembly having a first end and a second end, the platform support assembly disposed between the first and second weighing bars;

a weighing platform having a first end, a second end and an upper surface for supporting an object to be weighed, the weighing platform connected to the platform support assembly;

a weighing arm assembly connected to the first weighing bar, the weighing arm assembly comprising a first weighing arm having a first end and a second end and a spatially disposed second weighing arm having a first end and a second end, the first end of the first weighing arm connected to the first end of the first weighing bar and the first end of the second weighing arm connected to the second end of the first weighing bar, the first and second weighing arms extending from the first weighing bar in the direction of the second weighing bar;

a first summing bar assembly rigidly connected to the first and second weighing arms;

a second summing bar assembly rigidly connected to the the second weighing bar;

a first strap assembly for connecting the first end of the platform support assembly and the first weighing bar to the first end of the support frame;

a second strap assembly for connecting the second end of the platform support assembly and the second weighing bar to the second end of the support frame, the first and second strap assemblies cooperating to rotatingly support the first and second weighing bars whereby the first and second weighing bars are rotated in a direction in response to an object being disposed on the weighing platform for weighing;

a summing bar strap assembly for connecting the first and second summing bar assemblies for rotatably supporting the first and second summing bar assemblies whereby the first and second summing bar assemblies are rotated in response to the rotation of the first and second weighing bars by an object being disposed on the weighing platform for weighing.

2. The summing bar suspension scale of claim 1 wherein the first summing bar is rigidly connected to the first and second ends of the first weighing bar and rigidly connected to the first and second weighing arms and the second summing bar assembly is connected to the first and second ends of the second weighing bars and wherein the platform support assembly is further characterized as having a first side and a second side, and wherein the first summing bar assembly comprises:

a first support arm having a first end and a second end, the first end of the first support arm rigidly connected to the first weighing bar near the first end thereof so that the second end of the first support arm is disposed between the first weighing arm and the first side of the platform support assembly;

a first summing bar connected to the second end of the first support arm and to the first weighing arm;

a second support arm having a first end and a second end, the first end of the second support arm rigidly connected to the first weighing bar near the second end thereof so that the second end of the second support arm is disposed between the second weighing bar and second side of the platform support assembly; and a second summing bar connected to the second end of the second support arm and to the second weighing arm.

3. The summing bar suspension scale of claim 2 wherein the second summing bar assembly comprises:

a first support arm having a first end and a second end, the first end of the first support arm rigidly connected to the first end of the second weighing bar so that the first support arm is spatially disposed from the first weighing arm;

a second support arm having a first end and a second end, the first end of the first support arm rigidly connected to the second weighing bar near the first end thereof so that the first and second support arms are spatially disposed and the second support arm is spatially disposed from the first side of the platform support assembly;

a first summing bar connected to the second ends of the first and second support arms;

a third support arm having a first end and a second end, the first end of the third support arm rigidly connected to the second end of the second weighing bar so that the third support arm is spatially disposed from the second weighing arm;

a fourth support arm having a first end and a second end, the first end of the fourth support arm rigidly connected to the second weighing bar near the first end thereof so that the third and fourth support arms are spatially disposed and the fourth support arm is spatially disposed from the second side of the platform support assembly; and a second summing bar connected to the second ends of the third and fourth support arms.

4. The summing bar suspension scale of claim 3 wherein the platform support assembly comprises:

a first bar member having a first end and a second end, the first bar member, which defines the first end of the platform support assembly further characterized as having a substantially circular shaped cross-section;

a second bar member having a first end and a second end, the second bar member, which defines the second end of the platform support assembly further characterized as having a substantially circular shaped cross-section;

a first connector member having a first end and a second end, the first end of the first connector member connected to the first end of the first bar member and the second end of the first connector member connected to the first end of the second bar member; and a second connector member having a first end and a second end, the first end of the second connector member connected to the second end of the first bar member and the second end of the second connector member connected to the second end of the second bar member.

5. The summing bar suspension scale of claim 4 wherein the first strap assembly comprises:

a strap fabricated of a plurality of individual strands woven and interconnected wherein the strands are constructed of metal or plastic; and clamp assembly means for connecting the strap to each of the first bar member of the platform support assembly, the first weighing bar and the first end of the support frame.

6. The summing bar suspension scale of claim 5 wherein the clamp assembly means comprises:

a plurality of clamp rods, each of the clamp rods having a first end and a second end, the first and second ends of one of the clamp rod being connected to each of the first bar member of the platform support assembly, the first weighing bar and the first end of the support frame, the clamp rods extending a distance below the first bar member of the platform support member and a distance above the first weighing bar and the first end of the support frame so as to form strap openings, the strap openings being sized and shaped to receive a portion of the strap;

a plurality of retaining rods, one of the retaining rods being disposed near each of the clamp rods and extending across the strap opening, a portion of the strap extending through the strap opening and under and about a portion of the retaining rod and extending back through the strap opening whereby a force on the strap tending to pull the strap out of the strap opening pulls the retaining rods against the clamp rods and pulls the clamp rod into clamping engagement with the portions of the strap thereunder for clamping the strap against a portion of the first bar member of the platform support assembly, the first weighing bar and the first end of the support frame.

7. The summing bar suspension scale of claim 6 wherein the clamp rods are provided with a substantially U-shaped configuration.

8. The summing bar suspension scale of claim 7 wherein the strap has opposite ends and is provided with a rectangularly shaped cross-section having a width and a thickness.

9. The summing bar suspension scale of claim 7 wherein the strap is provided with opposite ends and is provided with a circularly shaped cross-section.

10. The summing bar suspension scale of claim 4 wherein the second strap assembly comprises:

a strap fabricated of a plurality of individual strands woven and interconnected wherein the strands are constructed of metal or plastic; and clamp assembly means for connecting the strap to each of the second bar member of the platform support assembly, the second weighing bar and the second end of the support frame.

11. The summing bar suspension scale of claim 10 wherein the clamp assembly means comprises:

a plurality of clamp rods, each of the clamp rods having a first end and a second end, the first and second ends of one of the clamp rod being connected to each of the second bar member of the platform support assembly, the second weighing bar and the second end of the support frame, the clamp rods extending a distance below the second bar member of the platform support assembly and a distance above the second weighing bar and the second end of the support frame so as to form strap openings, the strap openings being sized and shaped to receive a portion of the strap;

a plurality of retaining rods, one of the retaining rods being disposed near each of the clamp rods and extending across the strap opening, a portion of the strap extending through the strap opening and under and about a portion of the retaining rod and extending back through the strap opening whereby a force on the strap tending to pull the strap out of the strap opening pulls the retaining rods against the clamp rods and pulls the clamp rod into clamping engagement with the portions of the strap thereunder for clamping the strap against a portion of the second bar member of the platform support assembly, the second weighing bar and the second end of the support frame.

12. The summing bar suspension scale of claim 11 wherein the clamp rods are provided with a substantially U-shaped configuration.

13. The summing bar suspension scale of claim 12 wherein the strap has opposite ends and is provided with a rectangularly shaped cross-section having a width and a thickness.

14. The summing bar suspension scale of claim 12 wherein the strap is provided with opposite ends and is provided with a circularly shaped cross-section.

15. The summing bar suspension scale of claim 4 wherein each of the summing bar strap assemblies comprises:

a strap fabricated of a plurality of individual strands woven and interconnected wherein the strands are constructed of metal or plastic; and clamp assembly means for connecting one of the straps to the first summing bar of the first summing bar assembly and the first summing bar of the second summing bar assembly and another of the straps to the second summing bar of the first summing bar assembly and the second summing bar of the second summing bar assembly.

16. The summing bar suspension scale of claim 15 wherein the clamp assembly means comprises:

a plurality of clamp rods, each of the clamp rods having a first end and a second end, the first and second ends of one of the clamp rod being connected to each of the first and second summing bars of the first summing bar assembly and the first and second summing bars of the second summing bar assembly, the clamp rods extending a distance above the first and second summing bars of the first summing bar assembly and a distance below the first and second summing bars of the second summing bar assembly so as to form strap openings, the strap openings being sized and shaped to receive a portion of the strap;

a plurality of retaining rods, one of the retaining rods being disposed near each of the clamp rods and extending across the strap opening, a portion of the strap extending through the strap openings and under and about a portion of the retaining rod and extending back through the strap openings whereby a force on the strap tending to pull the strap out of the strap openings pulls the retaining rods against the clamp rods and pulls the clamp rod into clamping engagement with the portions of the strap thereunder for clamping the strap against a portion of the first and second summing bars of the first summing bar assembly and a portion of the first and second summing bars of the second summing bar assembly.

17. The summing bar suspension scale of claim 16 wherein each of the clamp rods are provided with a substantially U-shaped configuration.

18. The summing bar suspension scale of claim 17 wherein each of the straps has opposite ends and is provided with a rectangularly shaped cross-section having a width and a thickness.

19. The summing bar suspension scale of claim 17 wherein the each of the straps is provided with opposite ends and is provided with a circularly shaped cross-section.

20. A summing bar suspension scale for weighing an object, comprising:

a support frame having a first end and a second end;

a first weighing bar having a first end and a second end, the first weighing bar disposed near the first end of the support frame;

a second weighing bar having a first end and a second end, the second weighing bar disposed near the second end of the support frame;

a weighing platform assembly having a first end, a second end and a weighing platform having an upper supporting surface for supporting an object to be weighed, the weighing platform assembly being disposed between the first and second weighing bars;

a weighing arm assembly having a first end and a second end, the first end of the weighing arm assembly rigidly connected to the first weighing bar;

a first summing bar assembly rigidly connected to the weighing arm assembly;

a second summing bar assembly rigidly connected to the second weighing bar;

a first strap assembly for connecting the first end of the weighing platform, the first weighing bar and the first end of the support frame;

a second strap assembly for connecting the second end of the weighing platform, the second weighing bar and the second end of the support frame; and a summing bar strap assembly for connecting the first and second summing bar assemblies, the first and second summing bar assemblies cooperating with the summing bar strap assembly to rotatingly support the first and second weighing bars and the first and second summing bar assemblies whereby the first and second weighing bars and the first and second summing bar assemblies are rotated in a direction in response to an object being disposed on the weighing platform for weighing.

21. The summing bar suspension scale of claim 20 wherein the first strap assembly comprises:

a strap fabricated of a plurality of individual strands woven and interconnected wherein the strands are constructed of metal or plastic; and clamp assembly means for connecting the strap to the first end of the weighing platform assembly, to the first weighing bar and to the first end of the support frame.

22. The summing bar suspension scale of claim 21 wherein the clamp assembly means comprises:

a plurality of clamp rods, each of the clamp rods having a first end and a second end, the first and second ends of one of the clamp rod being connected to each of the first end of the weighing platform assembly, the first weighing bar and the first end of the support frame, the clamp rods extending a distance below the first end of the weighing platform assembly and a distance above the first weighing bar and the first end of the support frame so as to form strap openings, the strap openings being sized and shaped to receive a portion of the strap;

a plurality of retaining rods, one of the retaining rods being disposed near each of the clamp rods and extending across the strap opening, a portion of the strap extending through the strap opening and under and about a portion of the retaining rod and extending back through the strap opening whereby a force on the strap tending to pull the strap out of the strap opening pulls the retaining rods against the clamp rods and pulls the clamp rod into clamping engagement with the portions of the strap thereunder for clamping the strap against a portion of the first end of the weighing platform assembly, the first weighing bar and the first end of the support frame.

23. The summing bar suspension scale of claim 22 wherein the clamp rods are provided with a substantially U-shaped configuration.

24. The summing bar suspension scale of claim 23 wherein the strap has opposite ends and is provided with a rectangularly shaped cross-section having a width and a thickness.

25. The summing bar suspension scale of claim 23 wherein the strap is provided with opposite ends and is provided with a circularly shaped cross-section.

26. The summing bar suspension scale of claim 20 wherein the second strap assembly comprises:

a strap fabricated of a plurality of individual strands woven and interconnected wherein the strands are constructed of metal or plastic; and clamp assembly means for connecting the strap to the second end of the weighing platform assembly, to the second weighing bar and to the second end of the support frame.

27. The summing bar suspension scale of claim 26 wherein the clamp assembly means comprises:

a plurality of clamp rods, each of the clamp rods having a first end and a second end, the first and second ends of one of the clamp rod being connected to each of the second end of the weighing platform assembly, the second weighing bar and the second end of the support frame, the clamp rod connected to the second end of the weighing platform assembly extending a distance below the second end of the weighing platform assembly and the clamp rods connected to the second weighing bar and the second end of the support frame extending a distance above the second weighing bar and the second end of the support frame so as to form strap openings, the strap openings being sized and shaped to receive a portion of the strap;

a plurality of retaining rods, one of the retaining rods being disposed near each of the clamp rods and extending across the strap opening, a portion of the strap extending through the strap opening and under and about a portion of the retaining rod and extending back through the strap opening whereby a force on the strap tending to pull the strap out of the strap openings pulls the retaining rods against the clamp rods and pulls the clamp rod into clamping engagement with the portions of the strap thereunder for clamping the strap against a portion of the second end of weighing platform assembly, the second weighing bar and the second end of the support frame.

28. The summing bar suspension scale of claim 27 wherein the clamp rods are provided with a substantially U-shaped configuration.

29. The summing bar suspension scale of claim 26 wherein the strap has opposite ends and is provided with a rectangularly shaped cross-section having a width and a thickness.

30. The summing bar suspension scale of claim 26 wherein the strap is provided with opposite ends and is provided with a circularly shaped cross-section.

31. The summing bar suspension scale of claim 20 wherein the summing bar strap assembly comprises:

a strap fabricated of a plurality of individual strands woven and interconnected wherein the strands are constructed of metal or plastic; and clamp assembly means for connecting the strap to the first and second summing bar assemblies.

32. The summing bar suspension scale of claim 31 wherein the clamp assembly means comprises:

a plurality of clamp rods, each of the clamp rods having a first end and a second end, the first and second ends of one of the clamp rods being connected to the first summing bar assembly such that the clamp rod extends a distance above the first summing bar assembly and defines a strap opening sized and shaped to receive a portion of the strap, the first and second ends of another of the clamp rods being connected to the second summing bar assembly such that the clamp rod extends a distance below the second summing bar assembly and defines a strap opening sized and shaped to receive a portion of the strap; and a plurality of retaining rods, one of the retaining rods being disposed near each of the clamp rods and extending across the strap opening, a portion of the strap extending through the strap opening and under and about a portion of the retaining rod and extending back through the strap opening whereby a force on the strap tending to pull the strap out of the strap openings pulls the retaining rods against the clamp rods and pulls the clamp rod into clamping engagement with the portions of the strap thereunder for clamping the strap against the first and second summing bar assemblies.

33. The summing bar suspension scale of claim 32 wherein each of the clamp rods are provided with a substantially U-shaped configuration.

34. The summing bar suspension scale of claim 31 wherein the strap has opposite ends and is provided with a rectangularly shaped cross-section having a width and a thickness.

35. The summing bar suspension scale of claim 31 wherein the strap is provided with opposite ends and is provided with a circularly shaped cross-section.

36. A summing bar suspension scale for weighing an object, comprising:

a support frame having a first end and a second end;

a first weighing bar having a first end and a second end, the first weighing bar disposed near the first end of the support frame;

a second weighing bar having a first end and a second end, the second weighing bar disposed near the second end of the support frame;

a weighing platform assembly having a first end, a second end and an upper supporting surface for supporting an object to be weighed, the weighing platform disposed between the first and second weighing bars;

a weighing arm assembly having a first end and a second end, the first end of the weighing arm assembly rigidly connected to the first weighing bar;

a first strap assembly for connecting the first end of the weighing platform assembly and the first weighing bar to the first end of the support frame; and a second strap assembly for connecting the second end of the weighing platform assembly and the second weighing bar to the second end of the support frame, the first and second strap assemblies cooperating to rotatingly support the first and second weighing bars whereby the first and second weighing bars are rotated in a direction in response to an object being disposed on the upper supporting surface of the weighing platform assembly for weighing.

37. An improvement in an animal holding chute having a first side, a spatially disposed second side, a forward end and a rearward end wherein an animal is restrained in the holding chute in a substantially stable position, the improvement comprising:

at least one summing bar suspension scale for weighing of the animal confined in the holding chute, the summing bar suspension scale comprising:

a support frame having a first end and a second end;

a first weighing bar having a first end and a second end, the first weighing bar disposed near the first end of the support frame;

a second weighing bar having a first end and a second end, the second weighing bar disposed near the second end of the support frame;

a weighing platform assembly having a first end, a second end and a weighing platform having an upper supporting surface, the weighing platform providing a floor portion so that the animal restrained in the holding chute is supported by the weighing platform;

a weighing arm assembly having a first end and a second end, the first end of the weighing arm assembly rigidly connected to the first weighing bar;

a first summing bar assembly rigidly connected to the first weighing bar;

a second summing bar assembly rigidly connected to the second weighing bar;

a first strap assembly for connecting the first end of the weighing platform, the first weighing bar and the first end of the support frame;

a second strap assembly for connecting the second end of the weighing platform, the second weighing bar and the second end of the support frame;

a summing bar strap assembly for connecting the first and second summing bar assemblies, the first and second strap assemblies cooperating with the summing bar strap assembly to rotatingly support the first and second weighing bars and the first and second summing bar assemblies whereby the first and second weighing bars and the first and second summing bar assemblies are rotated in a direction in response to an object being disposed on the weighing platform for weighing; and means for outputting the weight of the animal on the weighing platform.

38. The improvement of claim 37 wherein the first strap assembly comprises:

a strap fabricated of a plurality of individual strands woven and interconnected wherein the strands are constructed of metal or plastic; and clamp assembly means for connecting the strap to the first end of the weighing platform assembly, to the first weighing bar and to the first end of the support frame.

39. The improvement of claim 38 wherein the clamp assembly means comprises:

a plurality of clamp rods, each of the clamp rods having a first end and a second end, the first and second ends of one of the clamp rod being connected to each of the first end of the weighing platform assembly, the first weighing bar and the first end of the support frame, the clamp rods extending a distance below the first end of the weighing platform assembly and a distance above the first weighing bar and the first end of the support frame so as to form strap openings, the strap openings being sized and shaped to receive a portion of the strap;

a plurality of retaining rods, one of the retaining rods being disposed near each of the clamp rods and extending across the strap opening, a portion of the strap extending through the strap opening and under and about a portion of the retaining rod and extending back through the strap opening whereby a force on the strap tending to pull the strap out of the strap opening pulls the retaining rods against the clamp rods and pulls the clamp rod into clamping engagement with the portions of the strap thereunder for clamping the strap against a portion of the first end of the weighing platform assembly, the first weighing bar and the first end of the support frame.

40. The improvement of claim 39 wherein the clamp rods are provided with a substantially U-shaped configuration.

41. The improvement of claim 40 wherein the strap has opposite ends and is provided with a rectangularly shaped cross-section having a width and a thickness.

42. The improvement of claim 40 wherein the strap is provided with opposite ends and is provided with a circularly shaped cross-section.

43. The improvement of claim 37 wherein the second strap assembly comprises:

a strap fabricated of a plurality of individual strands woven and interconnected wherein the strands are constructed of metal or plastic; and clamp assembly means for connecting the strap to the second end of the weighing platform assembly, to the second weighing bar and to the second end of the support frame.

44. The improvement of claim 43 wherein the clamp assembly means comprises:

a plurality of clamp rods, each of the clamp rods having a first end and a second end, the first and second ends of one of the clamp rod being connected to each of the second end of the weighing platform assembly, the second weighing bar and the second end of the support frame, the clamp rod connected to the second end of the weighing platform assembly extending a distance below the second end of the weighing platform assembly and the clamp rods connected to the second weighing bar and the second end of the support frame extending a distance above the second weighing bar and the second end of the support frame so as to form strap openings, the strap openings being sized and shaped to receive a portion of the strap;

a plurality of retaining rods, one of the retaining rods being disposed near each of the clamp rods and extending across the strap opening, a portion of the strap extending through the strap opening and under and about a portion of the retaining rod and extending back through the strap opening whereby a force on the strap tending to pull the strap out of the strap openings pulls the retaining rods against the clamp rods and pulls the clamp rod into clamping engagement with the portions of the strap thereunder for clamping the strap against a portion of the second end of weighing platform assembly, the second weighing bar and the second end of the support frame.

45. The improvement of claim 44 wherein the clamp rods are provided with a substantially U-shaped configuration.

46. The improvement of claim 37 wherein the strap has opposite ends and is provided with a rectangularly shaped cross-section having a width and a thickness.

47. The improvement of claim 37 wherein the strap is provided with opposite ends and is provided with a circularly shaped cross-section.

48. The improvement of claim 38 wherein the summing bar strap assembly comprises:

a strap fabricated of a plurality of individual strands woven and interconnected wherein the strands are constructed of metal or plastic; and clamp assembly means for connecting the strap to the first and second summing bar assemblies.

49. The improvement of claim 48 wherein the clamp assembly means comprises:

a plurality of clamp rods, each of the clamp rods having a first end and a second end, the first and second ends of one of the clamp rods being connected to the first summing bar assembly such that the clamp rod extends a distance above the first summing bar assembly and defines a strap opening sized and shaped to receive a portion of the strap, the first and second ends of another of the clamp rods being connected to the second summing bar assembly such that the clamp rod extends a distance below the second summing bar assembly and defines a strap opening sized and shaped to receive a portion of the strap; and a plurality of retaining rods, one of the retaining rods being disposed near each of the clamp rods and extending across the strap opening, a portion of the strap extending through the strap opening and under and about a portion of the retaining rod and extending back through the strap opening whereby a force on the strap tending to pull the strap out of the strap openings pulls the retaining rods against the clamp rods and pulls the clamp rod into clamping engagement with the portions of the strap thereunder for clamping the strap against the first and second summing bar assemblies.

50. An improvement in a refuse collection vehicle having a main frame, a container supporting frame and a container supported on the container supporting frame, the improvement comprising:

at least one summing bar suspension scale supported on the main frame of the refuse collection vehicle so as to be disposed below the container, the summing bar suspension scale comprising:

a support frame having a first end and a second end;

a first weighing bar having a first end and a second end, the first weighing bar disposed near the first end of the support frame;

a second weighing bar having a first end and a second end, the second weighing bar disposed near the second end of the support frame;

a weighing platform assembly having a first end, a second end and a weighing platform having an upper supporting surface, a portion of the weighing platform assembly disposed between the first and second weighing bars;

a weighing arm assembly having a first end and a second end, the first end of the weighing arm assembly rigidly connected to the first weighing bar;

a first summing bar assembly rigidly connected to the first weighing bar;

a second summing bar assembly rigidly connected to the second weighing bar;

a first strap assembly for connecting the first end of the weighing platform, the first weighing bar and the first end of the support frame;

a second strap assembly for connecting the second end of the weighing platform, the second weighing bar and the second end of the support frame;

a summing bar strap assembly for connecting the first and second summing bar assemblies, the first and second strap assemblies cooperating with the summing bar strap assembly to rotatingly support the first and second weighing bars and the first and second summing bar assemblies whereby the first and second weighing bars and the first and second summing bar assemblies are rotated in a direction in response to an object being disposed on the weighing platform for weighing;

means supported on the weighing platform of the weighing platform assembly for selectively engaging the container and raising the container from engagement with the container supporting frame so that the container and the refuse therein is temporarily supported on the weighing platform of the weighing platform assembly; and means for outputting the weight of the container and the refuse therein on the weighing platform.

51. The improvement of claim 50 wherein the first strap assembly comprises:

a strap fabricated of a plurality of individual strands woven and interconnected wherein the strands are constructed of metal or plastic; and clamp assembly means for connecting the strap to the first end of the weighing platform assembly, to the first weighing bar and to the first end of the support frame.

52. The improvement of claim 51 wherein the clamp assembly means comprises:

a plurality of clamp rods, each of the clamp rods having a first end and a second end, the first and second ends of one of the clamp rod being connected to each of the first end of the weighing platform assembly, the first weighing bar and the first end of the support frame, the clamp rods extending a distance below the first end of the weighing platform assembly and a distance above the first weighing bar and the first end of the support frame so as to form strap openings, the strap openings being sized and shaped to receive a portion of the strap;

a plurality of retaining rods, one of the retaining rods being disposed near each of the clamp rods and extending across the strap opening, a portion of the strap extending through the strap opening and under and about a portion of the retaining rod and extending back through the strap opening whereby a force on the strap tending to pull the strap out of the strap opening pulls the retaining rods against the clamp rods and pulls the clamp rod into clamping engagement with the portions of the strap thereunder for clamping the strap against a portion of the first end of the weighing platform assembly, the first weighing bar and the first end of the support frame.

53. The improvement of claim 52 wherein the clamp rods are provided with a substantially U-shaped configuration.

54. The improvement of claim 53 wherein the strap has opposite ends and is provided with a rectangularly shaped cross-section having a width and a thickness.

55. The improvement of claim 53 wherein the strap is provided with opposite ends and is provided with a circularly shaped cross-section.

56. The improvement of claim 50 wherein the second strap assembly comprises:

a strap fabricated of a plurality of individual strands woven and interconnected wherein the strands are constructed of metal or plastic; and clamp assembly means for connecting the strap to the second end of the weighing platform assembly, to the second weighing bar and to the second end of the support frame.

57. The improvement of claim 56 wherein the clamp assembly means comprises:

a plurality of clamp rods, each of the clamp rods having a first end and a second end, the first and second ends of one of the clamp rod being connected to each of the second end of the weighing platform assembly, the second weighing bar and the second end of the support frame, the clamp rod connected to the second end of the weighing platform assembly extending a distance below the second end of the weighing platform assembly and the clamp rods connected to the second weighing bar and the second end of the support frame extending a distance above the second weighing bar and the second end of the support frame so as to form strap openings, the strap openings being sized and shaped to receive a portion of the strap;

a plurality of retaining rods, one of the retaining rods being disposed near each of the clamp rods and extending across the strap opening, a portion of the strap extending through the strap opening and under and about a portion of the retaining rod and extending back through the strap opening whereby a force on the strap tending to pull the strap out of the strap openings pulls the retaining rods against the clamp rods and pulls the clamp rod into clamping engagement with the portions of the strap thereunder for clamping the strap against a portion of the second end of weighing platform assembly, the second weighing bar and the second end of the support frame.

58. The improvement of claim 57 wherein the clamp rods are provided with a substantially U-shaped configuration.

59. The improvement of claim 57 wherein the strap has opposite ends and is provided with a rectangularly shaped cross-section having a width and a thickness.

60. The improvement of claim 57 wherein the strap is provided with opposite ends and is provided with a circularly shaped cross-section.

61. The improvement of claim 50 wherein the summing bar strap assembly comprises:

a strap fabricated of a plurality of individual strands woven and interconnected wherein the strands are constructed of metal or plastic; and clamp assembly means for connecting the strap to the first and second summing bar assemblies.

62. The improvement of claim 61 wherein the clamp assembly means comprises:

a plurality of clamp rods, each of the clamp rods having a first end and a second end, the first and second ends of one of the clamp rods being connected to the first summing bar assembly such that the clamp rod extends a distance above the first summing bar assembly and defines a strap opening sized and shaped to receive a portion of the strap, the first and second ends of another of the clamp rods being connected to the second summing bar assembly such that the clamp rod extends a distance below the second summing bar assembly and defines a strap opening sized and shaped to receive a portion of the strap; and a plurality of retaining rods, one of the retaining rods being disposed near each of the clamp rods and extending across the strap opening, a portion of the strap extending through the strap opening and under and about a portion of the retaining rod and extending back through the strap opening whereby a force on the strap tending to pull the strap out of the strap openings pulls the retaining rods against the clamp rods and pulls the clamp rod into clamping engagement with the portions of the strap thereunder for clamping the strap against the first and second summing bar assemblies.

63. The improvement of claim 62 wherein each of the clamp rods are provided with a substantially U-shaped configuration.

64. The improvement of claim 63 wherein the strap has opposite ends and is provided with a rectangularly shaped cross-section having a width and a thickness.

65. The improvement of claim 63 wherein the strap is provided with opposite ends and is provided with a circularly shaped cross-section.

66. An improvement in a refuse collection vehicle having a frame and a container adapted to receive and hold refuse, the improvement comprising:

at least one summing bar suspension scale supported on the main frame of the refuse collection vehicle and adapted to supportingly engage the container, the summing bar suspension scale comprising:

a support frame having a first end and a second end;

a first weighing bar having a first end and a second end, the first weighing bar disposed near the first end of the support frame;

a second weighing bar having a first end and a second end, the second weighing bar disposed near the second end of the support frame;

a weighing platform assembly having a first end, a second end and a weighing platform having an upper supporting surface, a portion of the weighing platform assembly disposed between the first and second weighing bars such that the weighing platform supportingly engages the container of the refuse vehicle a selected distance above the first and second weighing bars;

a weighing arm assembly having a first end and a second end, the first end of the weighing arm assembly rigidly connected to the first weighing bar;

a first summing bar assembly rigidly connected to the first weighing bar;

a second summing bar assembly rigidly connected to the second weighing bar;

a first strap assembly for connecting the first end of the weighing platform, the first weighing bar and the first end of the support frame;

a second strap assembly for connecting the second end of the weighing platform, the second weighing bar and the second end of the support frame;

a summing bar strap assembly for connecting the first and second summing bar assemblies, the first and second strap assemblies cooperating with the summing bar strap assembly to rotatingly support the first and second weighing bars and the first and second summing bar assemblies whereby the first and second weighing bars and the first and second summing bar assemblies are rotated in a direction in response to an object being disposed on the weighing platform for weighing; and means for outputting the weight of the container and the refuse therein on the weighing platform.

67. The improvement of claim 66 wherein the first strap assembly comprises:

a strap fabricated of a plurality of individual strands woven and interconnected wherein the strands are constructed of metal or plastic; and clamp assembly means for connecting the strap to the first end of the weighing platform assembly, to the first weighing bar and to the first end of the support frame.

68. The improvement of claim 67 wherein the clamp assembly means comprises:

a plurality of clamp rods, each of the clamp rods having a first end and a second end, the first and second ends of one of the clamp rod being connected to each of the first end of the weighing platform assembly, the first weighing bar and the first end of the support frame, the clamp rods extending a distance below the first end of the weighing platform assembly and a distance above the first weighing bar and the first end of the support frame so as to form strap openings, the strap openings being sized and shaped to receive a portion of the strap;

a plurality of retaining rods, one of the retaining rods being disposed near each of the clamp rods and extending across the strap opening, a portion of the strap extending through the strap opening and under and about a portion of the retaining rod and extending back through the strap opening whereby a force on the strap tending to pull the strap out of the strap opening pulls the retaining rods against the clamp rods and pulls the clamp rod into clamping engagement with the portions of the strap thereunder for clamping the strap against a portion of the first end of the weighing platform assembly, the first weighing bar and the first end of the support frame.

69. The improvement of claim 68 wherein the clamp rods are provided with a substantially U-shaped configuration.

70. The improvement of claim 69 wherein the strap has opposite ends and is provided with a rectangularly shaped cross-section having a width and a thickness.

71. The improvement of claim 69 wherein the strap comprises at least one element having a circularly shaped cross-section.

72. The improvement of claim 66 wherein the second strap assembly comprises:

a strap fabricated of a plurality of individual strands woven and interconnected wherein the strands are constructed of metal or plastic; and clamp assembly means for connecting the strap to the second end of the weighing platform assembly, to the second weighing bar and to the second end of the support frame.

73. The improvement of claim 72 wherein the clamp assembly means comprises:

a plurality of clamp rods, each of the clamp rods having a first end and a second end, the first and second ends of one of the clamp rod being connected to each of the second end of the weighing platform assembly, the second weighing bar and the second end of the support frame, the clamp rod connected to the second end of the weighing platform assembly extending a distance below the second end of the weighing platform assembly and the clamp rods connected to the second weighing bar and the second end of the support frame extending a distance above the second weighing bar and the second end of the support frame so as to form strap openings, the strap openings being sized and shaped to receive a portion of the strap;

a plurality of retaining rods, one of the retaining rods being disposed near each of the clamp rods and extending across the strap opening, a portion of the strap extending through the strap opening and under and about a portion of the retaining rod and extending back through the strap opening whereby a force on the strap tending to pull the strap out of the strap openings pulls the retaining rods against the clamp rods and pulls the clamp rod into clamping engagement with the portions of the strap thereunder for clamping the strap against a portion of the second end of weighing platform assembly, the second weighing bar and the second end of the support frame.

74. The improvement of claim 73 wherein the clamp rods are provided with a substantially U-shaped configuration.

75. The improvement of claim 73 wherein the strap has opposite ends and is provided with a rectangularly shaped cross-section having a width and a thickness.

76. The improvement of claim 73 wherein the strap is provided with opposite ends and is provided with a circularly shaped cross-section.

77. The improvement of claim 66 wherein the summing bar strap assembly comprises:

a strap fabricated of a plurality of individual strands woven and interconnected wherein the strands are constructed of metal or plastic; and clamp assembly means for connecting the strap to the first and second summing bar assemblies.

78. The improvement of claim 77 wherein the clamp assembly means comprises:

a plurality of clamp rods, each of the clamp rods having a first end and a second end, the first and second ends of one of the clamp rods being connected to the first summing bar assembly such that the clamp rod extends a distance above the first summing bar assembly and defines a strap opening sized and shaped to receive a portion of the strap, the first and second ends of another of the clamp rods being connected to the second summing bar assembly such that the clamp rod extends a distance below the second summing bar assembly and defines a strap opening sized and shaped to receive a portion of the strap; and a plurality of retaining rods, one of the retaining rods being disposed near each of the clamp rods and extending across the strap opening, a portion of the strap extending through the strap opening and under and about a portion of the retaining rod and extending back through the strap opening whereby a force on the strap tending to pull the strap out of the strap openings pulls the retaining rods against the clamp rods and pulls the clamp rod into clamping engagement with the portions of the strap thereunder for clamping the strap against the first and second summing bar assemblies.

79. The improvement of claim 78 wherein each of the clamp rods are provided with a substantially U-shaped configuration.

80. The improvement of claim 79 wherein the strap has opposite ends and is provided with a rectangularly shaped cross-section having a width and a thickness.

81. The improvement of claim 79 wherein the strap is provided with opposite ends and is provided with a circularly shaped cross-section.

* * * * *